US010250965B2

(12) United States Patent
Bullen et al.

(10) Patent No.: US 10,250,965 B2
(45) Date of Patent: *Apr. 2, 2019

(54) MULTI-FUNCTION BONE CONDUCTING HEADPHONES

(71) Applicant: Big O, Inc., Wilmington, DE (US)

(72) Inventors: Stefan Bisits Bullen, Sydney (AU); Nicolas Sabharwal, Chevy Chase, MD (US); Sunil Sabharwal, Chevy Chase, MD (US)

(73) Assignee: BIG O, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,552

(22) Filed: Jul. 17, 2017

(65) Prior Publication Data
US 2017/0318379 A1    Nov. 2, 2017

Related U.S. Application Data

(63) Continuation of application No. 15/179,283, filed on Jun. 10, 2016.
(Continued)

(51) Int. Cl.
*H04R 5/02* (2006.01)
*H04R 1/10* (2006.01)
(Continued)

(52) U.S. Cl.
CPC .......... *H04R 1/1041* (2013.01); *G06F 3/162* (2013.01); *H04R 1/08* (2013.01); *H04R 1/1016* (2013.01);
(Continued)

(58) Field of Classification Search
CPC ......... G06F 3/162; H04R 1/08; H04R 1/1016; H04R 1/1041; H04R 1/1025;
(Continued)

(56) References Cited

U.S. PATENT DOCUMENTS 4,821,323 A * 4/1989 Papiernik ............. H04R 1/1066
381/151
2008/0089544 A1    4/2008 Ito
(Continued)

FOREIGN PATENT DOCUMENTS

KR    10-2009-0033564 A    4/2009
KR    10-2015-0003555 A    1/2015

OTHER PUBLICATIONS

International Search Report and Written Opinion, dated Mar. 31, 2017, issued in International Application No. PCT/US2016/068538.

*Primary Examiner* — Vivian Chin
*Assistant Examiner* — Friedrich W Fahnert
(74) *Attorney, Agent, or Firm* — Foley & Lardner LLP; Daniel Rose

(57) ABSTRACT

The present disclosure describes a multi-mode headset incorporating both bone conduction and aural transducers. Bone conduction plates of the headset rest on a users' temples, just in front of each ear in one implementation, and create sound through vibrations in a first mode, allowing the user to listen to the headset while still leaving environmental or external sounds audible. In a second mode, the user detaches aural transducers or earbuds from an attachment point and inserts them into the user's ears, blocking external noise and providing passive and/or active noise isolation. In a third mode, both the bone conduction plates and aural transducers may be used simultaneously, providing additional amplitude and potentially wider frequency response. The headset may include a switch, such as a magnetic proximity sensor detecting the position of the aural transducers, to control a mixer or amplifier to re-route audio through the aural transducers. Accordingly, the user may switch between modes and listen to high quality, noise-
(Continued)

isolated audio; or audio while remaining aware of external noises.

**17 Claims, 53 Drawing Sheets
(36 of 53 Drawing Sheet(s) Filed in Color)**

Related U.S. Application Data

(60) Provisional application No. 62/288,915, filed on Jan. 29, 2016.

(51) Int. Cl.
*G06F 3/16* (2006.01)
*H04R 1/08* (2006.01)
*H04R 3/04* (2006.01)
*H04R 5/033* (2006.01)
*H04R 5/04* (2006.01)

(52) U.S. Cl.
CPC ......... *H04R 1/1025* (2013.01); *H04R 1/1033* (2013.01); *H04R 3/04* (2013.01); *H04R 5/033* (2013.01); *H04R 5/04* (2013.01); *H04R 2420/07* (2013.01); *H04R 2460/13* (2013.01)

(58) Field of Classification Search
CPC ........ H04R 1/1033; H04R 3/04; H04R 5/033; H04R 5/04; H04R 2420/07; H04R 2460/13
USPC .... 381/59, 74, 151, 309, 326, 334, 374, 381
See application file for complete search history.

(56) References Cited

U.S. PATENT DOCUMENTS

| | | |
|---|---|---|
| 2010/0329485 A1 | 12/2010 | Fukuda |
| 2011/0301729 A1* | 12/2011 | Heiman ................. H04S 7/301 700/94 |
| 2012/0229248 A1 | 9/2012 | Parshionikar et al. |
| 2013/0329183 A1* | 12/2013 | Blum ..................... G02C 11/10 351/158 |
| 2014/0253868 A1* | 9/2014 | Jannard .................. G02C 9/04 351/158 |

* cited by examiner

MULTI-FUNCTION BONE CONDUCTING HEADPHONES

RELATED APPLICATIONS

This application is a continuation application of U.S. application Ser. No. 15/179,283, entitled "Multi-Function Bone Conducting Headphones," filed Jun. 10, 2016, which application claims priority to and the benefit of U.S. Provisional Patent Application No. 62/288,915, entitled "Multi-Function Bone Conducting Headphones," filed Jan. 29, 2016, the entirety of both applications is hereby incorporated by reference.

FIELD

The present application relates to headsets for audio reproduction, including both a bone conduction and aural transducer.

BACKGROUND

Bone conduction transducers provide a user with the ability to listen to audio recordings or transmissions, while leaving the ears unblocked to receive ambient or environmental sound. Headsets using such a system are particularly desired for outdoor sports (e.g. jogging, bicycling, etc.), where a user may need to retain situational awareness of potential environmental dangers. However, bone conduction transducers are frequently frequency-limited, reducing the quality of audio reproduction. Similarly, because the user can hear environmental noises, the noise floor of such headsets is high, resulting in limited dynamic range.

In-ear audio transducers, sometimes referred to as earbuds or earphones and referred to generally as aural transducers, may provide higher audio quality, both through their interaction with the eardrum of the user, and via passive noise-reduction by physically sealing or blocking the ear canal. However, aural transducers block ambient noise, and as such may be unsuitable or dangerous for outdoor sports.

SUMMARY

The present disclosure describes a multi-modal headset incorporating both bone conduction and aural transducers. Bone conduction plates of the headset rest on a users' temples, just in front of each ear in one implementation, and create sound through vibrations in a first mode, allowing the user to listen to the headset while still leaving environmental or external sounds audible. This allows a user to safely ride a bicycle or jog in traffic, allows athletes to communicate with teammates or competitors, and allows users to talk to friends or parents monitor children while listening to music. In a second mode, the user detaches aural transducers or earbuds from an attachment point, such as a magnetic "nest" or retention element, and inserts them into the user's ears, blocking external noise and providing passive (and, in some implementations, active) noise isolation. The headset may include a switch, such as a magnetic proximity sensor detecting the position of the aural transducers, to control a mixer or amplifier to re-route audio through the aural transducers. In a third mode, both the bone conduction plates and aural transducers may be used simultaneously, providing additional amplitude and potentially wider frequency response. Accordingly, the user may switch between modes and listen to high quality, noise-isolated audio; or audio while remaining aware of external noises.

BRIEF DESCRIPTION OF THE FIGURES

The patent or application file contains at least one drawing executed in color. Copies of this patent or patent application publication with color drawings will be provided by the Office upon request and payment of the necessary fee.

FIG. 5I is an exploded view of the implementation of a multi-mode headset of FIGS. 5A and 5B;

FIG. 6I is an exploded view of the implementation of a multi-mode headset of FIGS. 6A and 6B;

In the drawings, like reference numbers generally indicate identical, functionally similar, and/or structurally similar elements.

DETAILED DESCRIPTION

The following description in conjunction with the above-reference drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

The present disclosure describes a multi-mode headset incorporating both bone conduction and aural transducers. Bone conduction plates of the headset rest on a users' temples, just in front of each ear in one implementation, and create sound through vibrations in a first mode, allowing the user to listen to the headset while still leaving environmental or external sounds audible. In a second mode, the user detaches aural transducers or earbuds from an attachment point, such as a magnetic "nest" or retention element, and inserts them into the user's ears, blocking external noise and providing passive (and, in some implementations, active) noise isolation. In a third mode, the user may use both the aural transducers or earbuds and bone conduction plates simultaneously, providing additional amplitude and potentially wider frequency response. The headset may include a switch, such as a magnetic proximity sensor detecting the position of the aural transducers, to control a mixer or amplifier to re-route audio through the aural transducers. Accordingly, the user may switch between modes and listen to high quality, noise-isolated audio; or audio while remaining aware of external noises. In some implementations, the headset may also incorporate magnetic proximity sensors, one or more noise-cancelling microphones, Bluetooth or other wireless connectivity, micro-USB port or similar interfaces for data and/or battery charging, wireless batter charging, rechargeable batteries such as lithium ion batteries, water-resistant or water-proof sealing, and/or passive sound dampening elements to reduce sound leakage.

Figure 1A:
FIG. 1A is an illustration of a multi-mode headset in a first, bone-conduction mode, according to one implementation.
Figure 1B:
FIG. 1B is an illustration of the multi-mode headset of FIG. 1A in a second aural mode, according to one implementation.

FIG. 1A is an illustration of a multi-mode headset 100 in a first, bone-conduction mode, according to one implementation, and FIG. 1B is an illustration of the multi-mode headset 100 of FIG. 1A in a second or third aural mode, according to one implementation. Headset 100 may include an aural transducer 102 which may be moved between two positions 102a, 102b as shown. In a first mode illustrated in FIG. 1A, the aural transducer 102a is retained, either mechanically or magnetically, adjacent to a frame portion of the headset. The frame portion may be referred to as a "nest", retention point, basket, or by other such terms. The nest may include a magnetic proximity sensor (e.g. triggered by a magnetic portion of aural transducer 102 or by a separate magnet in a frame or enclosure of aural transducer 102) or mechanical switch to detect the positioning of the transducer 102. When in the first position 102a, audio is routed to a bone conduction transducer 104 that rests on the skin over the temple, jawbone, or other such area of the user.

The user may detach the aural transducer from the nest and insert an earbud portion into the user's ear in position 102b, as shown in FIG. 1B. Upon detection of the absence of the transducer in the nest by the magnetic or mechanical switch in the nest, the headset may reroute audio to the aural transducers. In some implementations, in a third mode, a mix of audio may be provided to both the bone conduction and aural transducers. For example, in one such implementation, additional low frequency audio or bass may be provided via the bone conduction transducers.

In some implementations, a portion of the frame of the headset connected to or enclosing aural transducer 102 may be flexible, such as a rubberized material, allowing the user to freely move the transducer from the nest to an in-ear position and back. In other implementations, said portion of the frame of the headset may comprise a hinge or ball joint or other mechanism to allow the user to move the transducer between positions. In some implementations, the aural transducer 102 may be connected to the headset by a wire or cable, as shown in FIG. 1D, discussed below. In a further implementation, such a cable may be extendable so that the transducer 102 may be extended from a nest position in the frame of the headset to the user's ear. In some implementations, the cable may be held under tension by a spring-loaded retraction mechanism.

FIGS. 1A and 1B illustrate a left portion of the headset in one implementation. The left portion may be connected via a band 106 to a corresponding right portion (not illustrated). As shown, band 106 may be oriented to be worn behind the head of the user when in use, while in other implementations, band 106 may be oriented to be worn over the top of the head of the user. In many implementations, band 106 may include a power element, such as a rechargeable battery, and/or an antenna for wireless connectivity (e.g. Bluetooth or similar near field communication systems).

In many implementations, a portion of the frame of the headset 100 may include control buttons, such as buttons for play/pause, forward, back, volume, and power, to allow a user to control their listening experience and/or answer telephone calls on a connected smart phone or other device. In one implementation, one or more control buttons may be placed on a portion of the frame above a bone conduction transducer 104 as shown.

In some implementations, headset 100 may include passive noise cancelling features when in use in the second or third, aural modes, such as rubberized pads on the aural transducers to form a tight or sound-blocking seal over or in the user's ear canals. The headset 100 may also include active noise cancellation, such as one or more microphones to receive external or ambient noise. Such ambient noise may be reproduced by the aural transducers with a delay and/or phase inversion to acoustically cancel the noise. In some implementations, such microphones may be placed on a portion of the frame of the headset above the aural transducer 102, so as to be in close proximity to the transducer. In still other implementations, the headset may include one or more microphones for receiving the user's speech, for use with phone calls, speech commands, voice-to-text, or other such features.

To prevent noise leakage from the headset, in some implementations, the bone conduction transducers may be held in place on the user's skin with a critically damped system of shock absorption and/or tension. This mechanism may absorb vibrations of the bone conduction transducer, preventing them from propagating further through the headset. Such implementations may also increase the effectiveness of the bone conduction transducers, requiring less electrical power for the same audible volume, increasing battery life.

In some implementations, the headset may incorporate a rechargeable battery, such as a lithium-ion battery. The battery may be charged via a plug by an external voltage supply, such as a micro-universal serial bus (USB) plug or similar plug; or may be charged via a wireless charging system, such as the Qi inductive power standard. In one such implementation, the headset may incorporate a wireless power receiver, including an inductive coil and rectifier.

In some implementations, the headset 100 may be waterproofed or sealed against water. The headset 100 may be capable of playing audio, for example through the bone conduction transducer, while underwater. In some such implementations, the headset 100 may include internal memory for storing and playing back audio, as the water may block wireless signals from other devices.

In some implementations, the headset 100 may include an audio input port, such as an ⅛th inch stereo jack. This may allow the user to use the headset 100 with devices not capable of Bluetooth or other wireless communication.

Figure 1C:
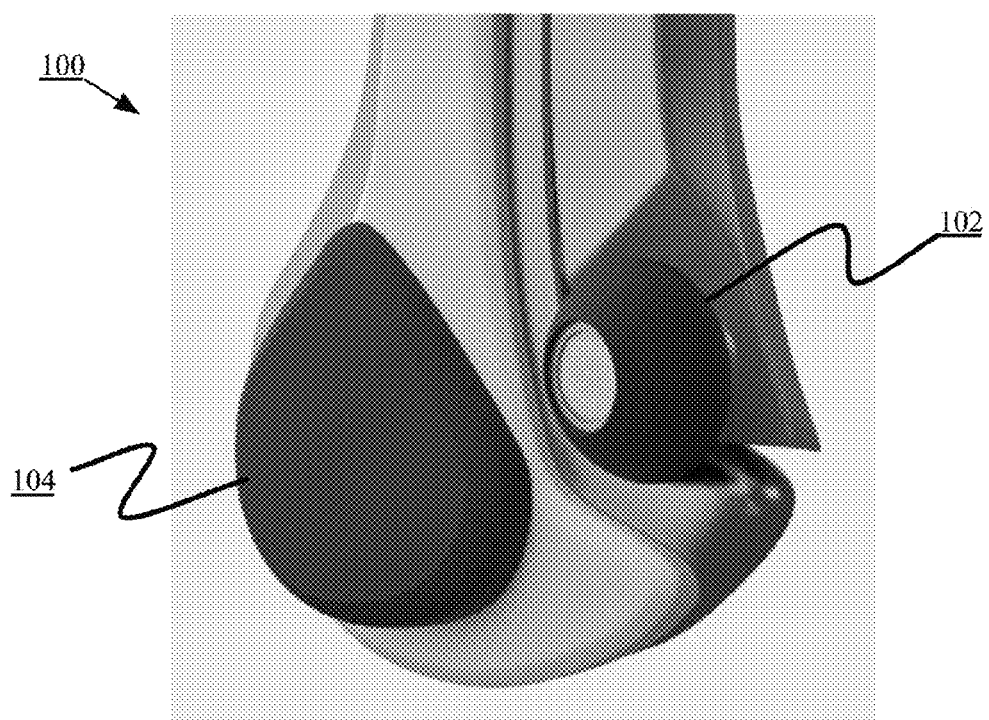
FIG. 1C is an illustration of a portion of a multi-mode headset, according to one implementation.
Figure 1D:
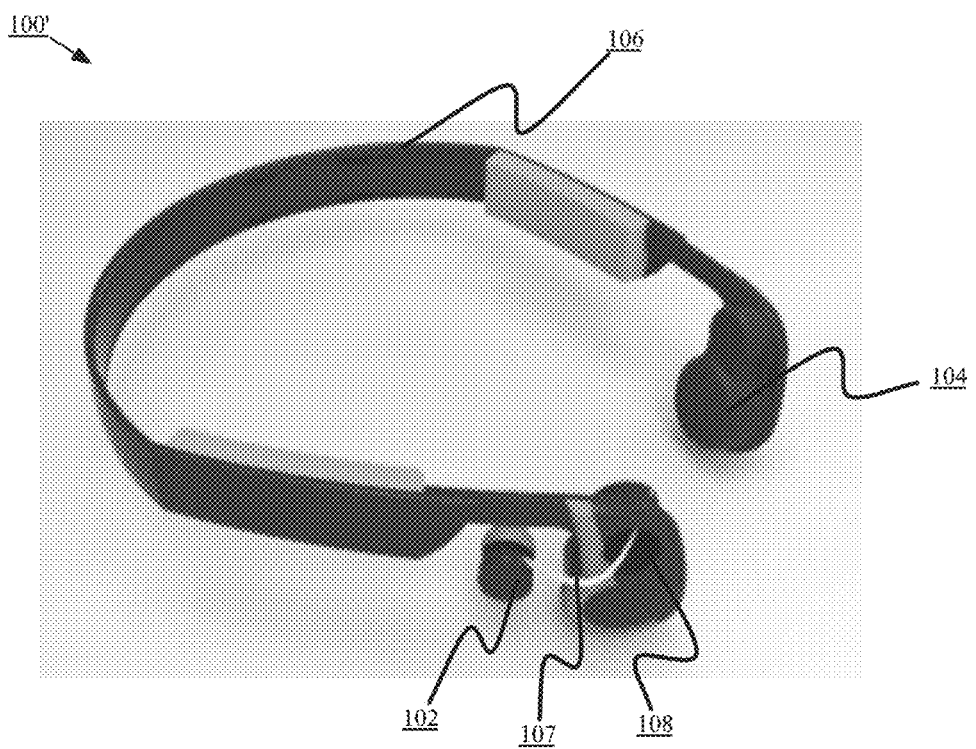
FIG. 1D is an illustration of a multi-mode headset, according to another implementation.

FIG. 1C is an illustration of a portion of a multi-mode headset 100, according to one implementation, showing an interior side of the frame and transducers 102, 104. The materials covering one or either transducer may include rubber, plastic, foamed plastic or rubber, or any other type and form of material.

FIG. 1D is an illustration of a multi-mode headset 100', according to another implementation, including removable earbuds 102 connected via a cable 107 to the headset. As discussed above, in such implementations, the cable may be extendable so that the aural transducer 102 may be extended from a nest position 108 in the frame of the headset to the user's ear. In some implementations, the cable may be held under tension by a spring-loaded retraction mechanism. The retraction mechanism may include a locking mechanism, such that the user may use the earbuds in a comfortable position without any tension applied to cable 107. When ending use or switching between modes, the user may pull on the cable 107 slightly to release tension, releasing the locking mechanism, and allowing the spring to retract cable 107. Such locking mechanisms may include, for example, a spool or take up reel, a ratchet and a spring-loaded pawl. In other implementations, the cable may be under gentle tension continuously, but to a low level that is not uncomfortable during wear. In still other implementations, the cable may not have a retraction mechanism, and the user may manually push cable 107 into the headset when switching modes.

In some implementations, the earbud or aural transducer 102 may fit snugly into nest position 108. For example, a portion of nest position 108 may comprise a cavity lined in a compressible material, such as rubber, neoprene, or other such material that may compress slightly and retain the earbud through friction when not in use. In other implementations, nest position 108 may include a magnet to attract a corresponding magnet in transducer 102, such as a permanent magnet in a driver of the transducer. Accordingly, when not in use, the transducer may be magnetically retained within the nest 108 in such implementations.

Figure 1E:
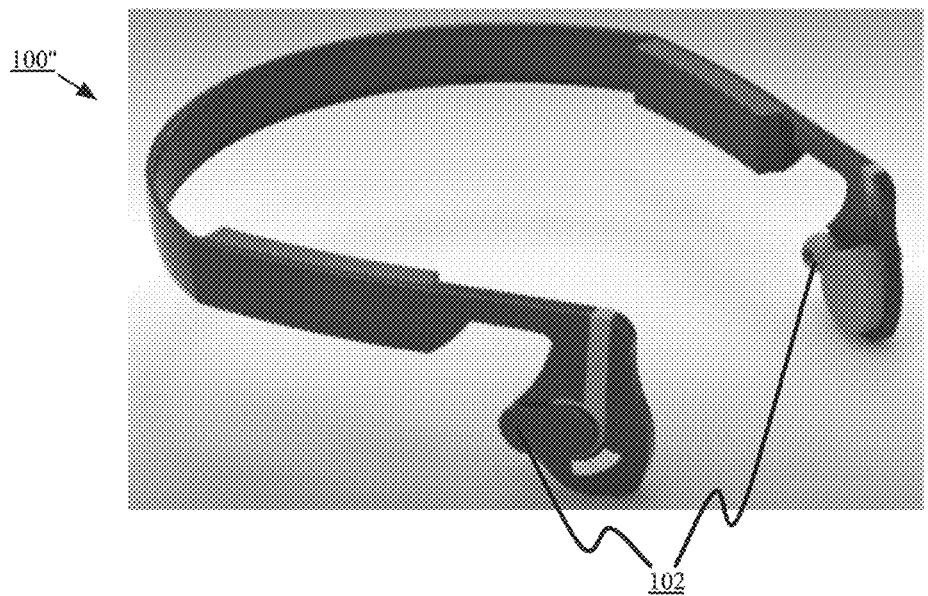
FIGS. 1E and 1F are isometric and side views of a multi-mode headset, according to another implementation.
Figure 1F:
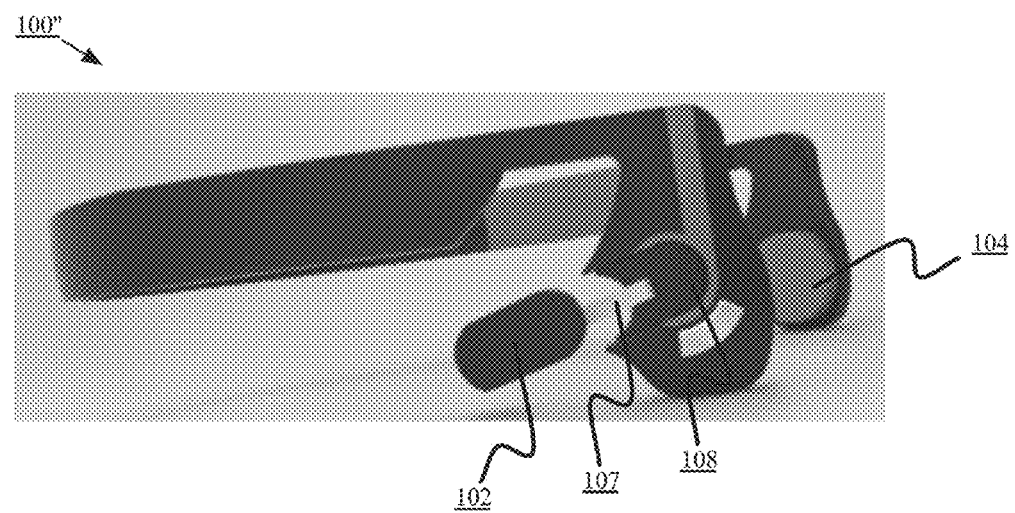

FIGS. 1E and 1F are isometric and side views of a multi-mode headset 100", according to another implementation. As with the implementation of FIG. 1D, the transducer 102 may be attached by a cable 107 to the headset. Cable 107 may comprise a flat (e.g. ribbon) cable as shown or a round (e.g. coaxial or twisted pair) cable, including conductors for providing audio signals to transducer 102. In some implementations, cable 107 may include additional elements, such as electromagnetic or electrostatic shielding, or strengthening elements such as fabric or thread to reduce tension on the conductors.

As shown in FIG. 1F, a nest portion 108 of the headset may be part of a surface of the headset and not include an embedded cavity, in some implementations. In such implementations, transducer 102 may be retained when not in use by a magnet, as discussed above. In other implementations, a portion of the enclosure of transducer 102 may include one or more slots to fit with corresponding tabs on the edges of nest 108, allowing the transducer 102 to slide with only one degree of freedom when positioned in the nest 108. As discussed above, in some implementations, cable 107 may be held under tension by a retraction mechanism, opposing any sliding motion.

Figure 2:
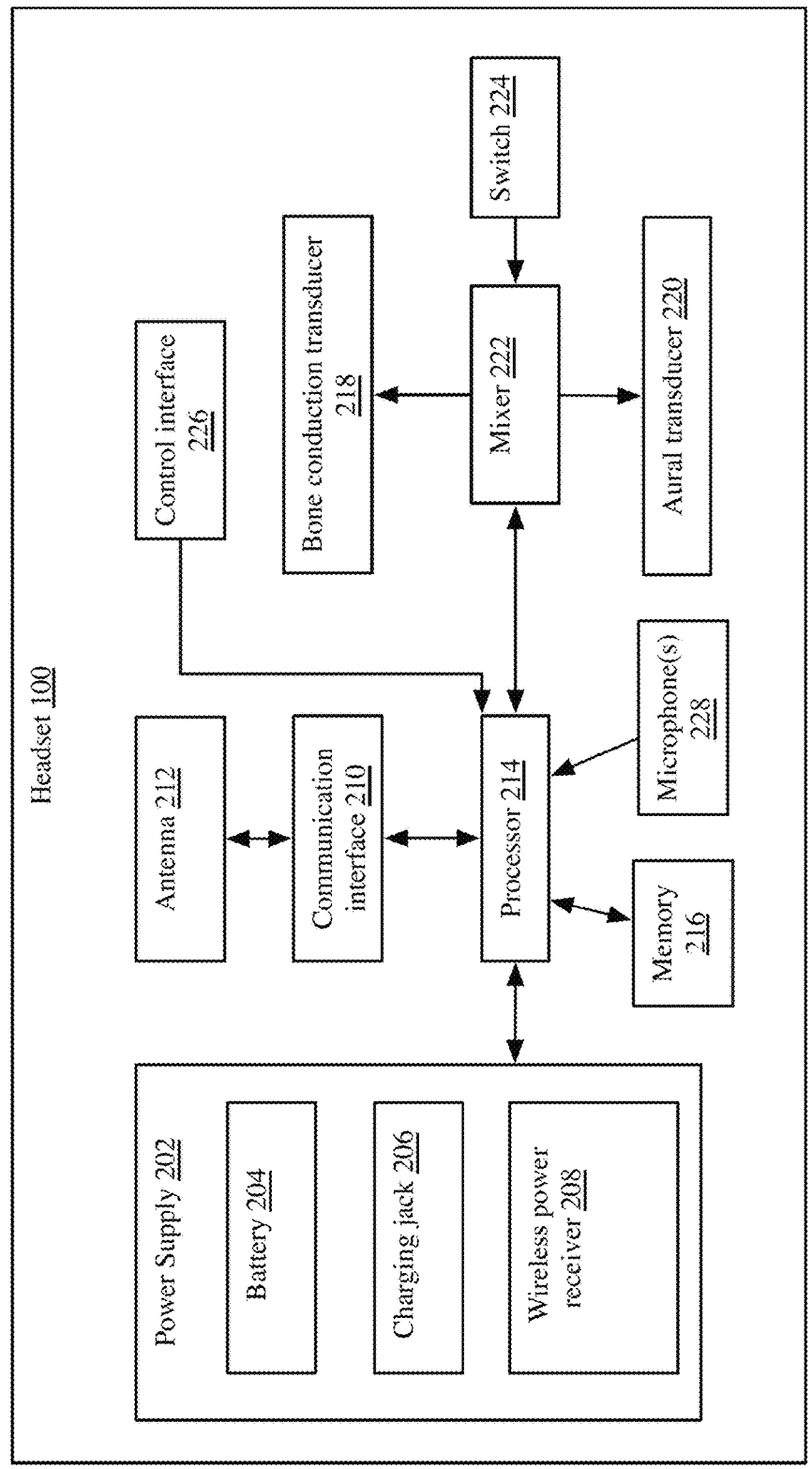
FIG. 2 is a block diagram of an implementation of a multi-mode headset.
Figures 3A, 3B:
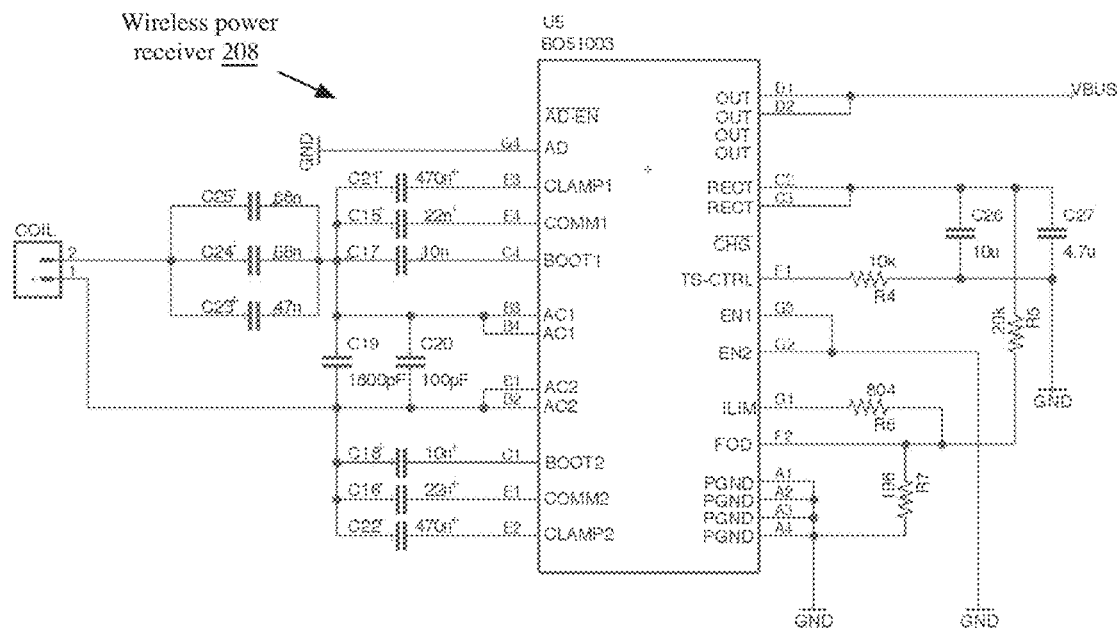
FIG. 3A is a schematic of a wireless power receiver for a multi-mode headset, according to one implementation.
FIG. 3B is a schematic of a power supply for a multi-mode headset, according to one implementation.

FIG. 2 is a block diagram of an implementation of a multi-mode headset 100. As discussed above, the headset may include a power supply 202. In some implementations, power supply 202 may include a battery 204, such as a rechargeable battery. The battery may be charged via a charging jack 206 and/or via a wireless power receiver 208. Referring ahead to FIG. 3A, illustrated is a schematic of a wireless power receiver for a multi-mode headset, according to one implementation. In one implementation, the power receiver may comprise an inductive coil and a power supply integrated circuit, such as a BQ51003 Qi-compliant power supply manufactured by Texas Instruments, Inc., or any other type and form of wireless power receiving circuitry. The receiver 208 may supply power to a power supply 202, such as an implementation of the power supply 202 illustrated in the schematic of FIG. 3B.

Returning to FIG. 2, the headset may include a communication interface 210 for receiving and/or transmitting audio or other data. The communication interface 210 may include a wired interface, such as an ⅛th inch TRS stereo jack, or a wireless interface, such as a Bluetooth interface, 802.11 (WiFi) interface, cellular interface, or other such interface. The communication interface 210 may comprise one or more antennas 212, which may be positioned within or along a portion of a frame 106 of the headset 100, such as in a band to be worn across the back or top of the head of the user, or in any other portion of the frame. The communication interface 210 may allow the headset to communicate or be paired with any other type and form of computing device, such as a smart phone, tablet, desktop computer, laptop computer, or other such device. In other implementations, the communication interface 210 may allow the headset to receive analog audio from another device. In still other implementations, the communication interface 210 may allow the headset to receive and/or transmit audio or other data via a network, such as a local area network, wide area network such as the Internet, cellular network, or any combination of these or other networks.

Figure 3C:
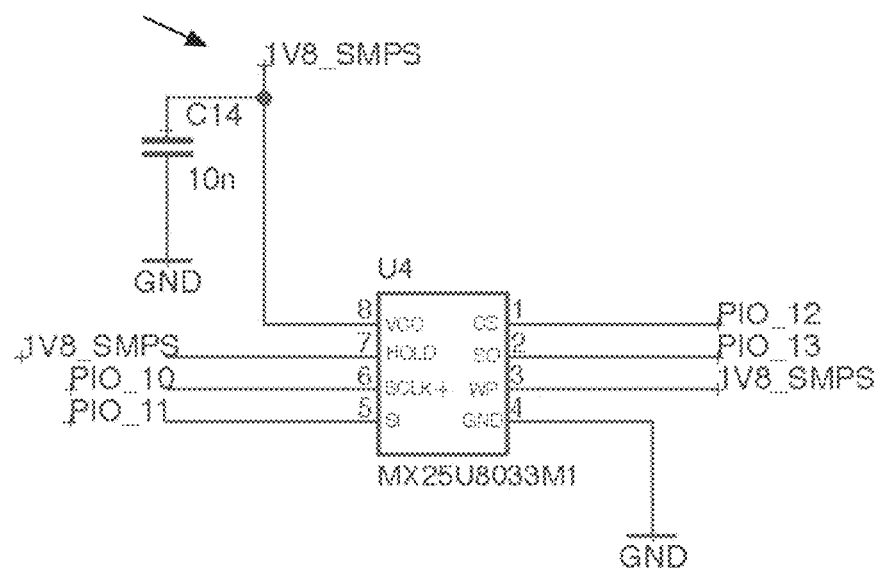
FIG. 3C is a schematic of a memory device for a multi-mode headset, according to one implementation.
Figure 3D:
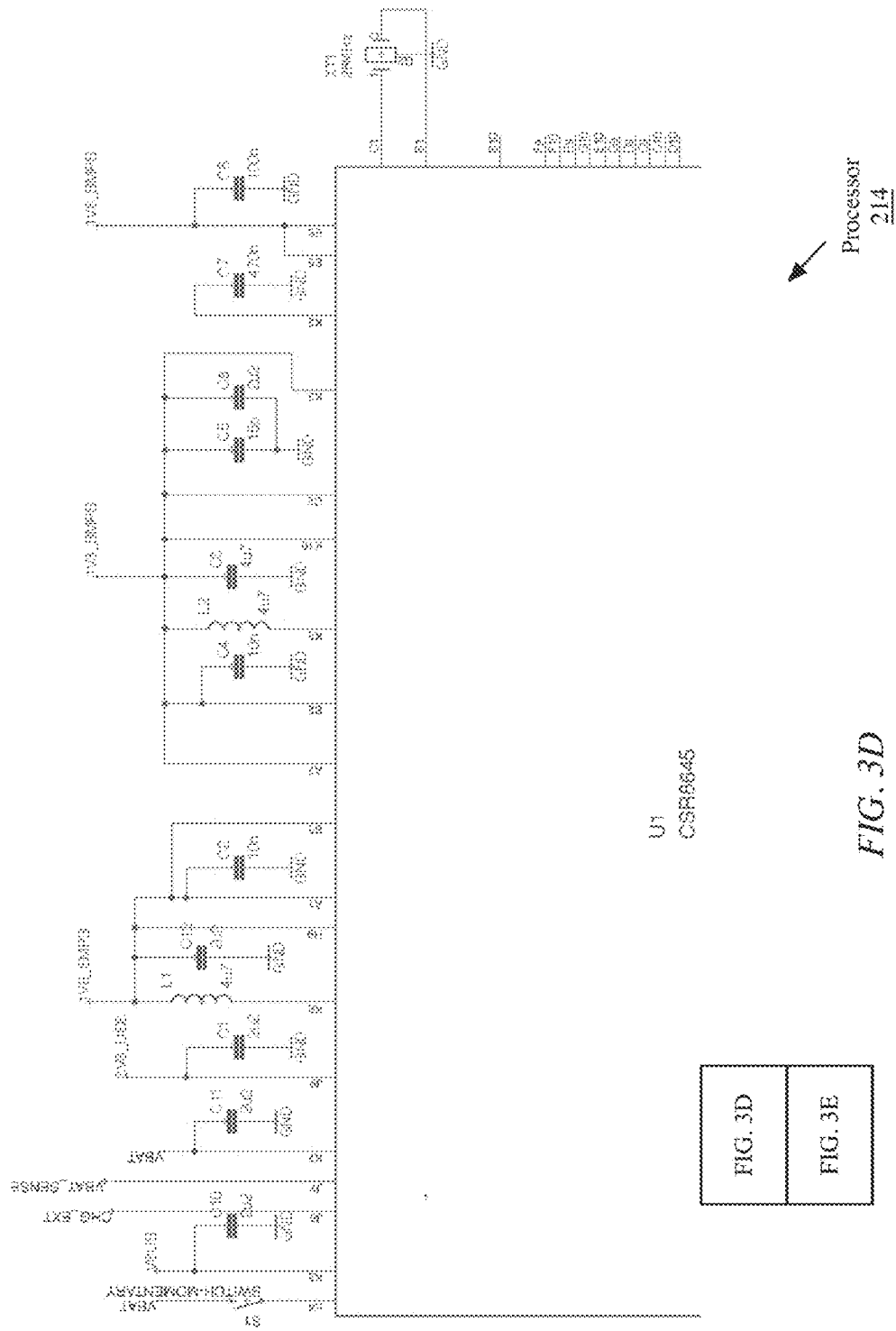
FIGS. 3D and 3E are a schematic of a processor and wireless interface for a multi-mode headset, divided across two figures for clarity, according to one implementation.
Figure 3E:
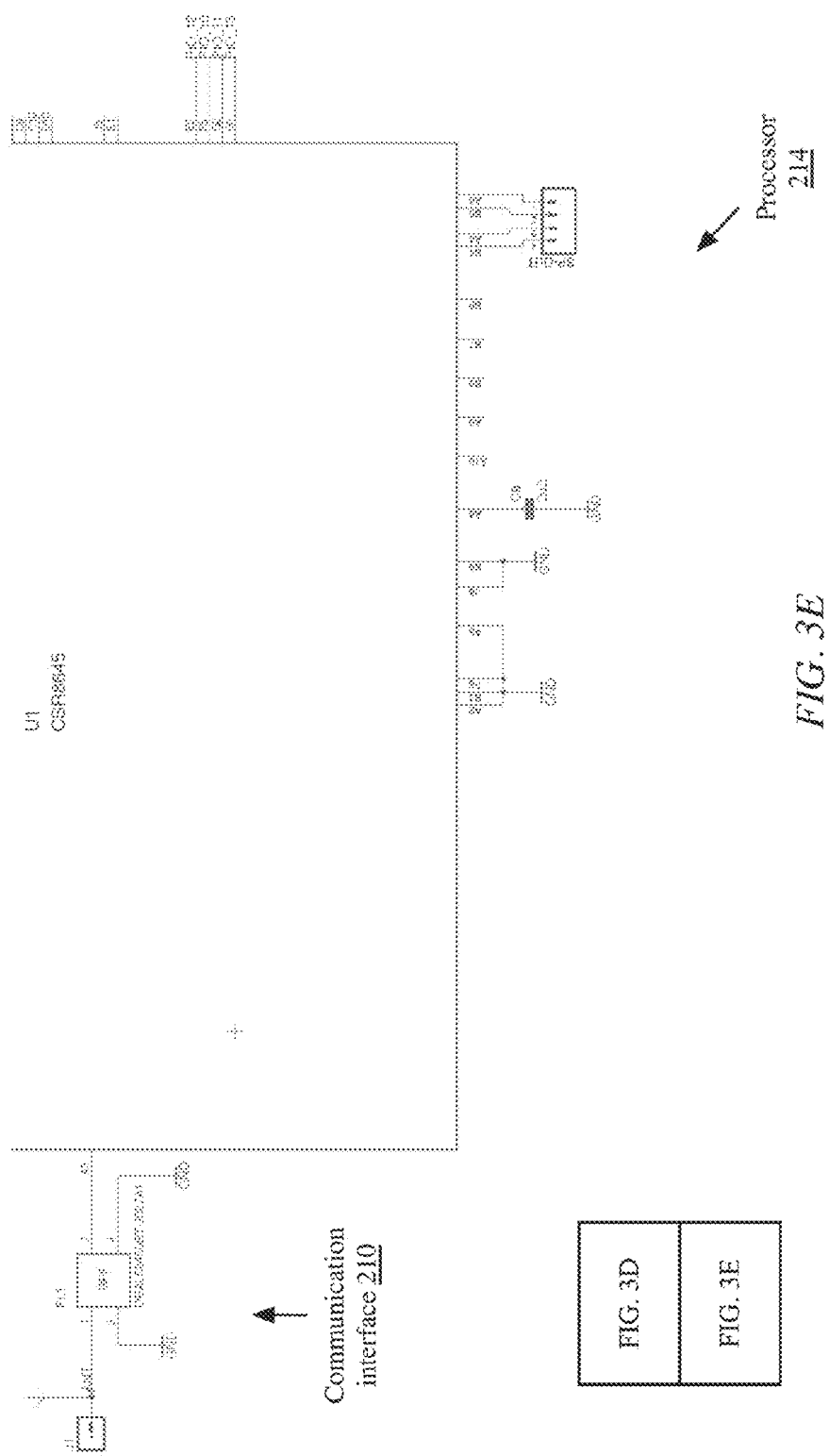

In some implementations, the headset 100 may include a processor 214 and a memory 216. The processor may be any logic circuitry that responds to and processes instructions fetched from a memory unit 216 or other storage, or performs other functions. The processor may be provided by a microprocessor unit, such as: those manufactured by Intel Corporation of Santa Clara, Calif.; those manufactured by Motorola Corporation of Schaumburg, Ill.; those manufactured by Apple Inc. of Cupertino Calif., or any other single- or multi-core processor, or any other processor capable of operating as described herein, or a combination of two or more single- or multi-core processors. Referring briefly to FIGS. 3D and 3E, illustrated (divided across the figures for clarity) is a schematic utilizing one such processor 214, a BlueCore CSR8645 integrated circuit manufactured by Cambridge Silicon Radio Ltd., including an 80 MHz RISC processor, aptX digital audio processor, internal ROM, and Bluetooth communication interface. In such implementations, the processor may provide Bluetooth pairing and control and audio transmitting and receiving functionality.

Returning to FIG. 2, headset 100 may include a memory 216. Memory 216 may may be one or more memory chips capable of storing data and allowing any storage location to be directly accessed by the processor 214, such as random access memory (RAM) of any type. In some embodiments, memory 216 may include cache memory or other types of memory. Referring briefly to FIG. 3C, illustrated is a schematic of a memory unit 216 in one implementation. Memory unit 216 may comprise an integrated circuit such as an MX25U8033 8 Mb Flash memory manufactured by Macronix International Co., or any other type and form of memory unit. Memory unit 216 may be RAM, flash memory, a hard drive, an EPROM, or any other type and form of memory device or combination of memory devices. Memory 216 may also include one or more media buffers 118, which may be used for storage of received media files, and/or input or output buffers for playback engines of a processor 214.

Returning to FIG. 2, a headset 100 may include a bone conduction transducer 218 and an aural or in-ear transducer 220. Headset 100 may also include a mixer 222. In some implementations, mixer 222 may selectively route audio from the processor 214 to either bone conduction transducer 218 or aural transducer 220, or both. Thus, although referred to as a mixer 222, in some such implementations, mixer 222 may comprise a multi-pole switch to route a stereo audio signal bus to either transducer 218, 220. In another implementation, a mixer 222 may comprise a summing amplifier or other mixing circuit for providing audio at variable levels to bone conduction transducer 218 and aural transducer 220.

In some implementations, as discussed above, switch or mixer 222 may provide audio to bone conduction transducer 218 in a first mode and to aural transducer 220 in a second mode, or may provide audio to both bone conduction transducer 218 and aural transducer 220 in a third mode (such as for additional bass response). For example, in one such implementation, a mixer 222 may comprise an inverse multiplexer, selectively providing an input signal to one or more outputs. For example, a control circuit may provide a 2-bit signal to direct mixer 222 to direct audio to the bone conduction transducer 218 (e.g. on a "01" input), to the aural transducer (e.g. on an "10" input), or to both (e.g. on a "11" input).

Mixer 222 may be controlled by a switch 224, which may comprise one or more magnetic, mechanical, optical, capacitive, or other such switches. In some implementations, switch 224 may be configured in a first position (e.g. engaged) when an aural transducer 220 is positioned within a nest of the frame of the headset, and in a second position (e.g. disengaged) when the aural transducer 220 is removed from the nest. For example, switch 224 may comprise a Hall effect sensor detecting a magnetic field of a magnet in transducer 220 when positioned in the nest. In another example, switch 224 may comprise a mechanical or optical switch positioned on a portion of a cable retraction mechanism connected to cable between the headset and transducer 220, triggered to detect when the transducer 220 is removed from a position within the nest. In still another example, switch 224 may comprise a physical leaf switch located within the nest, closed when transducer 220 is within the nest.

As discussed above, in some implementations, a multi-mode headset may have one mode in which the aural transducer 220 is used alone and another mode in which both the aural transducer and bone conduction transducer 218 are used together. In both modes, the aural transducer may be removed from a nest position, triggering switch 224. To switch between these modes, in some implementations, a user may manually enable or disable the bone conduction transducer. This may be done via an additional physical switch or button on the headset, or via a software application such as an application running on a Bluetooth-paired smart phone. In still another implementation, a second sensor may detect whether the headset is in position on a user's temples. For example, a piezoelectric or capacitive switch may be positioned within or next to the bone conduction transducer. When in position on the user's temples, the pressure on the frame or proximity of the user's skin may close the switch, enabling or activating the bone conduction transducer (for example, enabling an output of mixer 222, enabling a bit of a control signal to an inverse multiplexer of the mixer, etc.). In another example, the headset may include an optical sensor blocked by the user's skin when the bone conduction transducers are in position on the user's temples.

Mixer 222 may comprise one or more analog or digital signal processors or equalizers for adjusting signals to the bone conduction transducer 218 and/or aural transducer 220 when in various operating modes. For example, bone conduction transducers 218 typically have different frequency ranges than aural transducers 220, most often lower, extending to frequencies below 50 Hz, and sometimes below 20

Hz; and narrower, rarely extending above 12 kHz, and sometimes not above 8 kHz or 4 kHz. In some implementations, audio signals may be filtered before being provided to the transducers 218, 220. For example, a low pass filter may be applied to a signal to the bone conduction transducer 218 limiting frequencies above 250 Hz, and a high pass filter applied to the signal to the aural transducer 220 limiting frequencies below 125 Hz. This may limit distortion in each transducer, resulting in a higher fidelity combined signal. In some implementations, the processors or equalizers may be controlled by software, such as an application on a Bluetooth paired smartphone or via a control interface 226, discussed in more detail below. For example, in one implementation, a crossover frequency (or low pass and high pass filter frequencies) may be user selectable. In another implementation, relative amplitudes of the signals may be user selectable. For example, in one implementation, a "bass boost" mode may provide a higher amplitude signal to the bone conduction transducer without increasing the amplitude of the signal to the aural transducer 220. This may provide the user with substantial low end audio without overly stressing an electrostatic diaphragm of an aural transducer 220.

Headset 100 may comprise a control interface 226, which may include one or more buttons, capacitive switches or touch sensitive surfaces, dials, or other interface elements for allowing a user to control volume, playback, and/or power. The control interface 226 may be positioned at various positions around the frame of the headset. In some implementations, control interface 226 may also include output elements, such as LEDs or other lighting to indicate communication, power, and/or battery status.

In some implementations, headset 100 may include one or more microphones 228. Microphones 228 may include microphones for picking up a user's voice, such as for telephone calls, voice commands, speech-to-text functions, or other such functionality. Microphones 228 may also include one or more microphones for active noise cancellation, as discussed above.

Different implementations of headset 100 may include various designs or features, some implementations of which are discussed below and illustrated at FIGS. 4A-8H.

Figure 4A:
FIGS. 4A and 4B are isometric views of one implementation of a multi-mode headset.
Figure 4B:
Figure 4C:
FIGS. 4C-4H are plan views of the implementation of a multi-mode headset of FIGS. 4A and 4B.
Figure 4D:
Figure 4E:
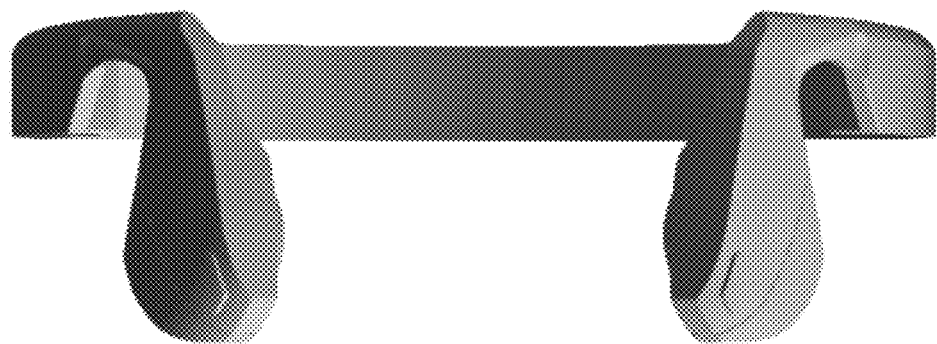
Figure 4F:
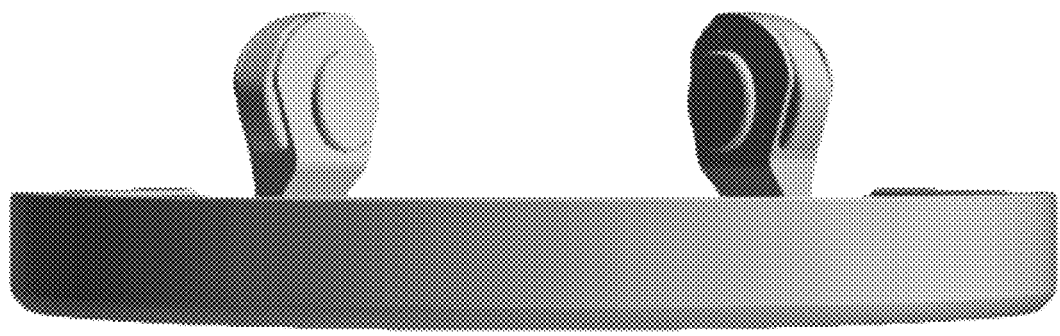
Figure 4G:
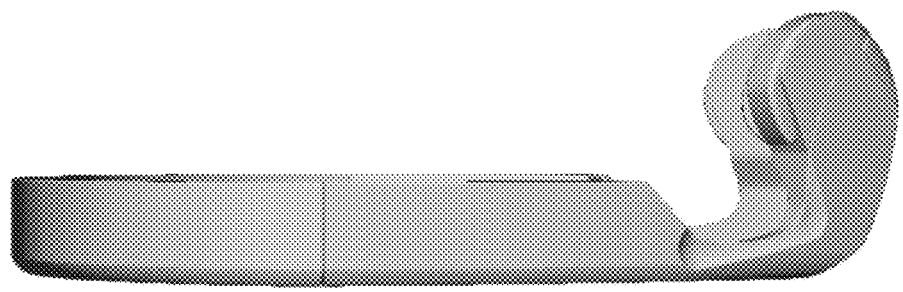
Figure 4H:

FIGS. 4A and 4B are isometric views of one implementation of a multi-mode headset. FIGS. 4C-4H are plan views of the implementation of a multi-mode headset of FIGS. 4A and 4B.

Figure 5A:
FIGS. 5A and 5B are isometric views of another implementation of a multi-mode headset.
Figure 5B:
Figure 5C:
FIGS. 5C-5H are plan views of the implementation of a multi-mode headset of FIGS. 5A and 5B.
Figure 5D:
Figure 5E:
Figure 5F:
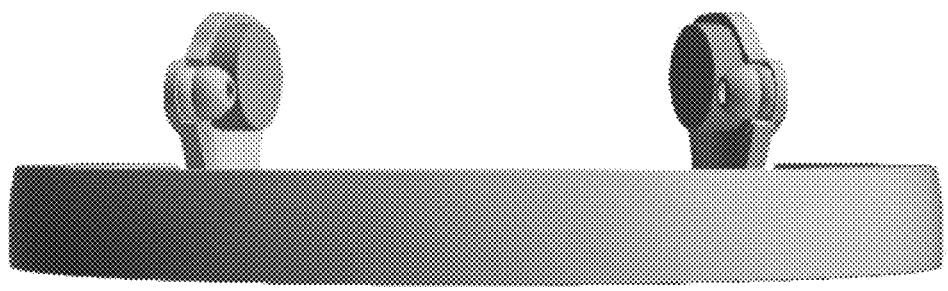
Figure 5G:
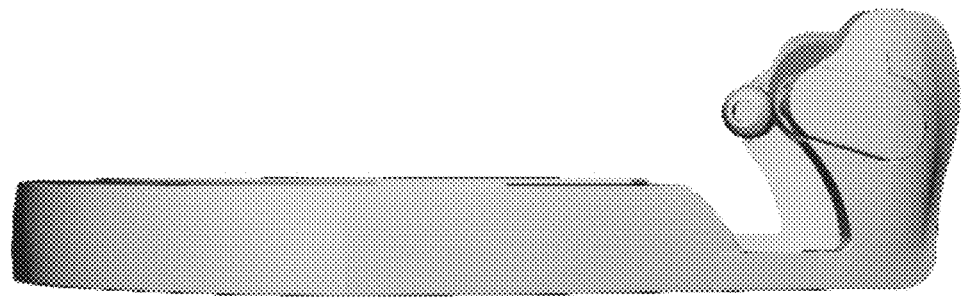
Figure 5H:
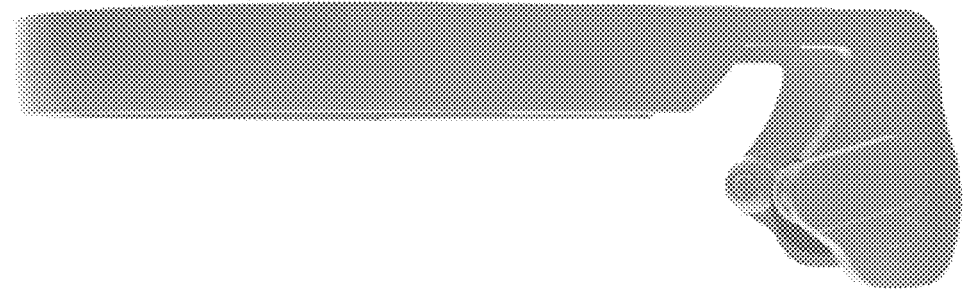
Figure 51:
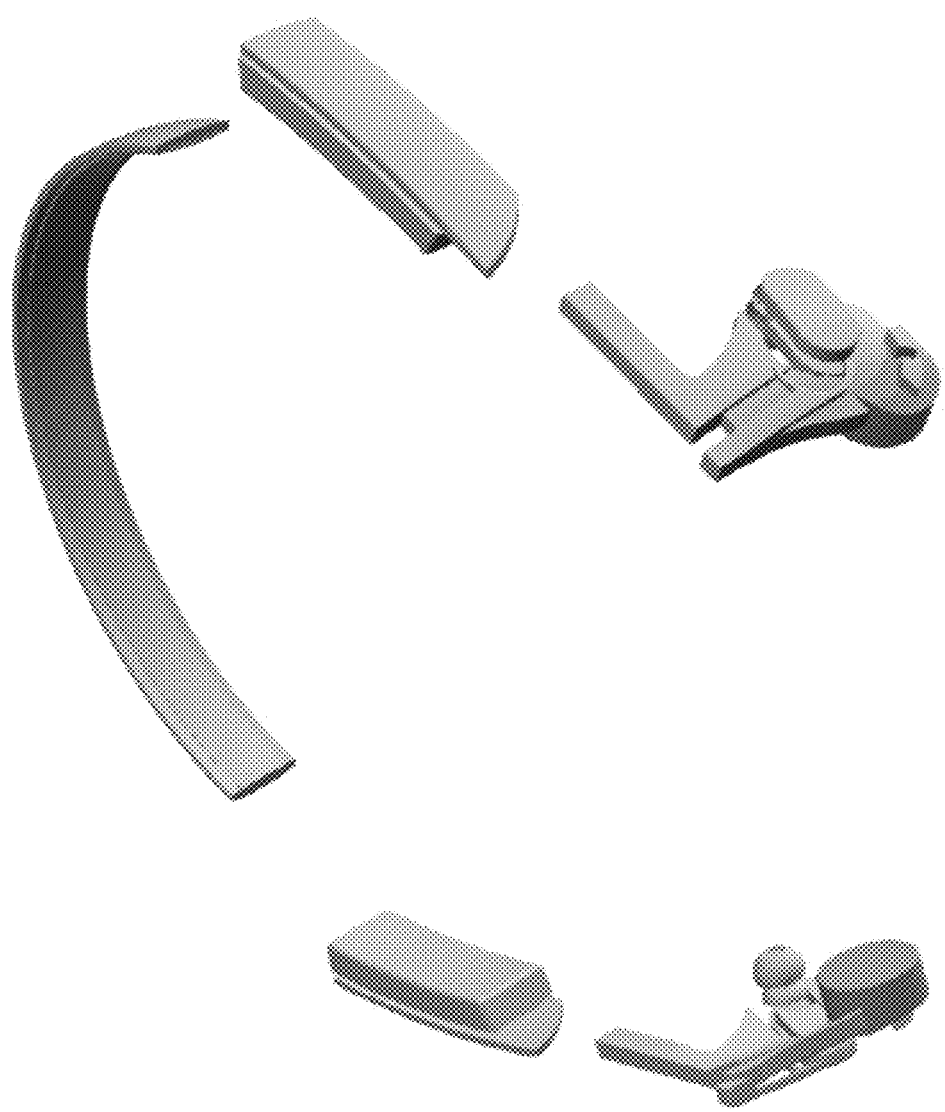

FIGS. 5A and 5B are isometric views of another implementation of a multi-mode headset. FIGS. 5C-5H are plan views of the implementation of a multi-mode headset of FIGS. 5A and 5B. FIG. 5I is an exploded view of the implementation of a multi-mode headset of FIGS. 5A and 5B.

Figure 6A:
FIGS. 6A and 6B are isometric views of another implementation of a multi-mode headset.
Figure 6B:
Figure 6C:
FIGS. 6C-6H are plan views of the implementation of a multi-mode headset of FIGS. 6A and 6B.
Figure 6D:
Figure 6E:
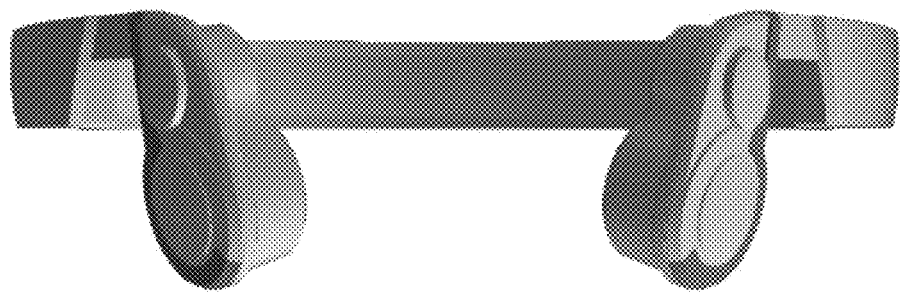
Figure 6F:
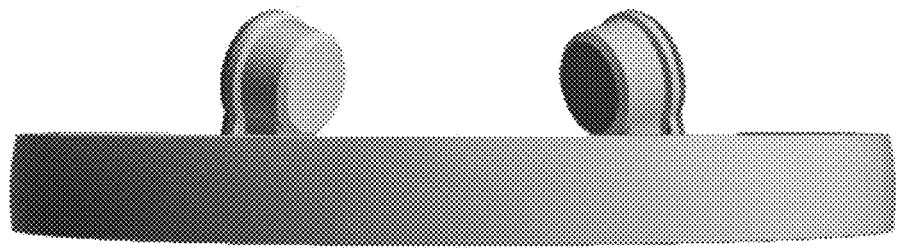
Figure 6G:
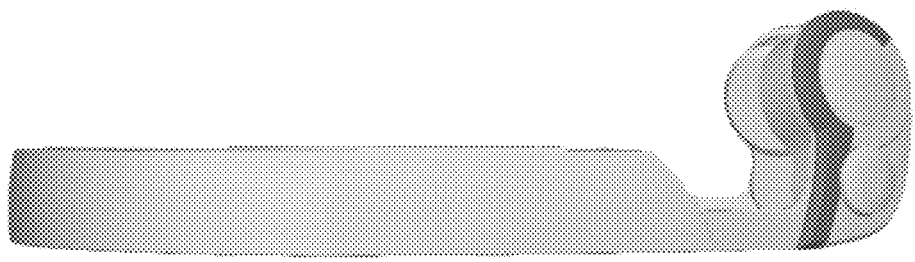
Figure 6H:
Figure 61:
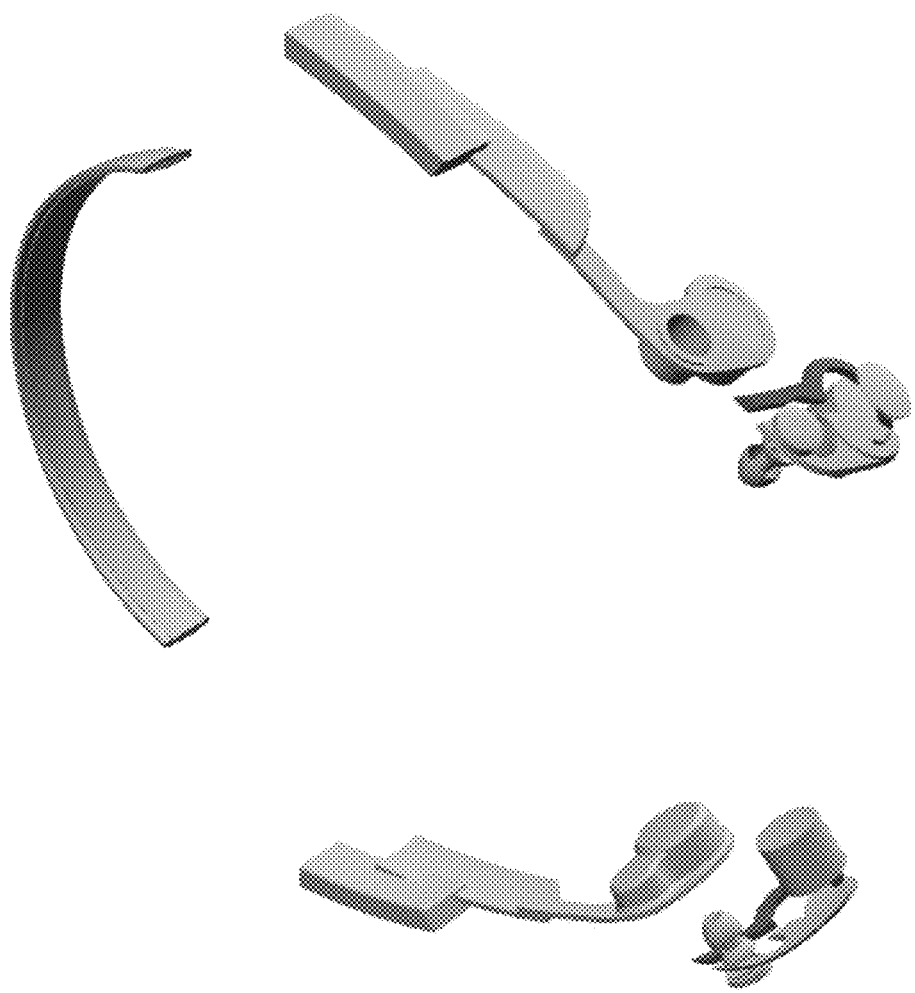

FIGS. 6A and 6B are isometric views of another implementation of a multi-mode headset. FIGS. 6C-6H are plan views of the implementation of a multi-mode headset of FIGS. 6A and 6B. FIG. 6I is an exploded view of the implementation of a multi-mode headset of FIGS. 6A and 6B.

Figure 7A:
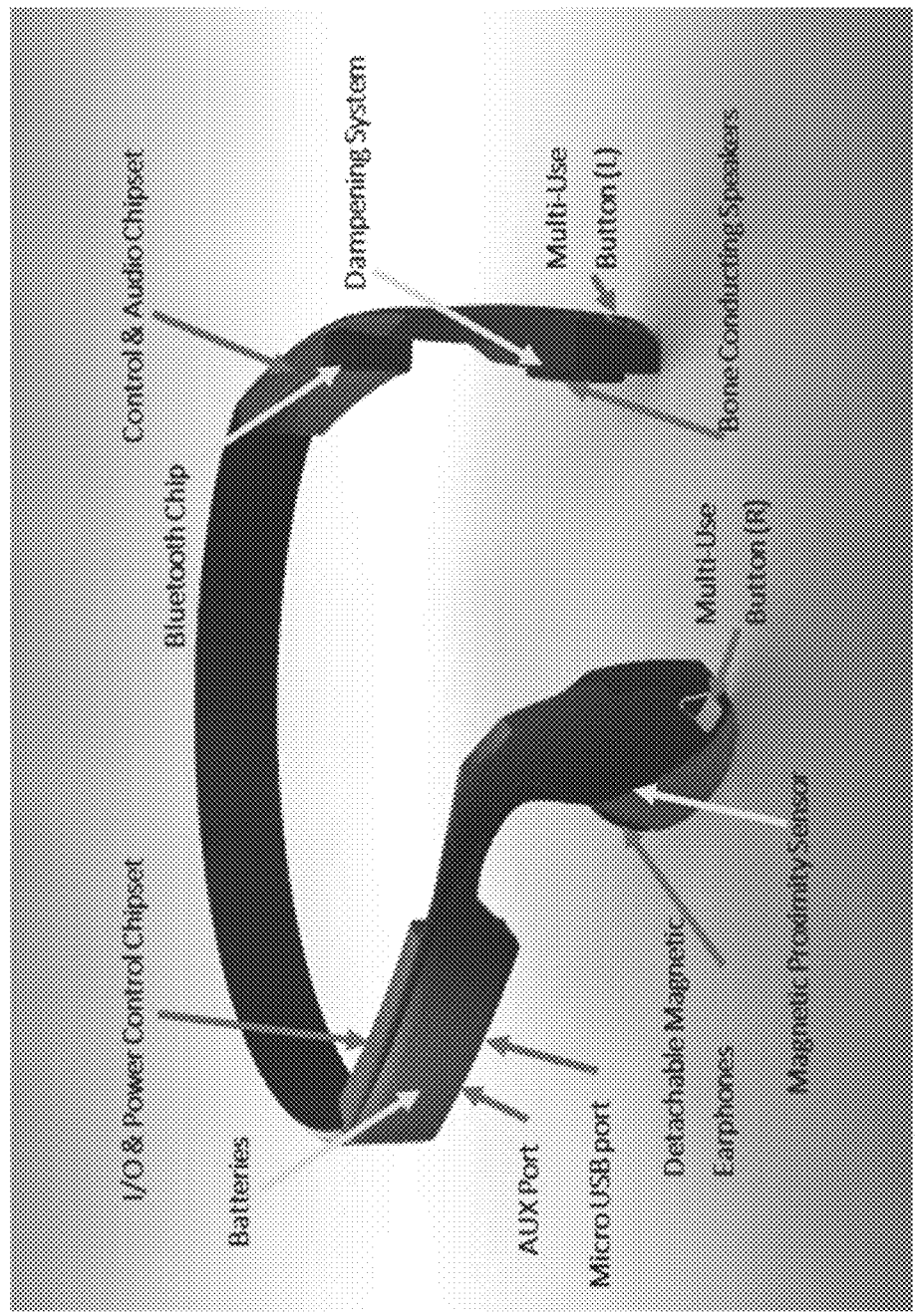
FIG. 7A is an illustration of another implementation of a multi-mode headset.
Figure 7B:
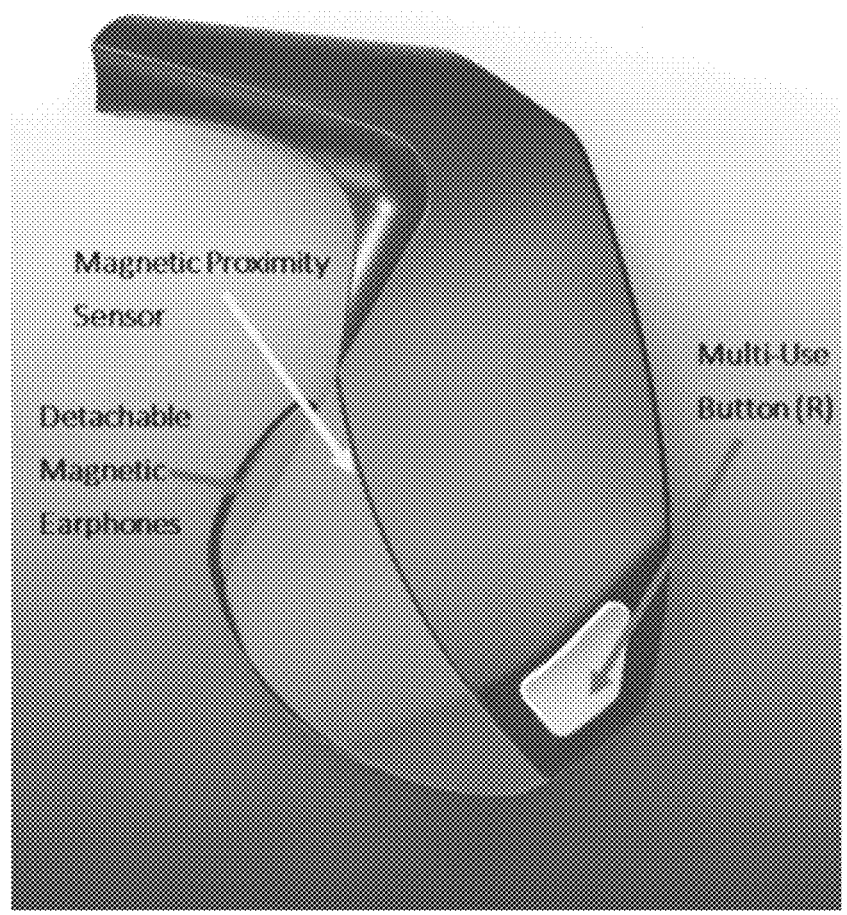
FIGS. 7B and 7C are illustrations of portions of the implementation of a multi-mode headset of FIG. 7A.
Figure 7C:
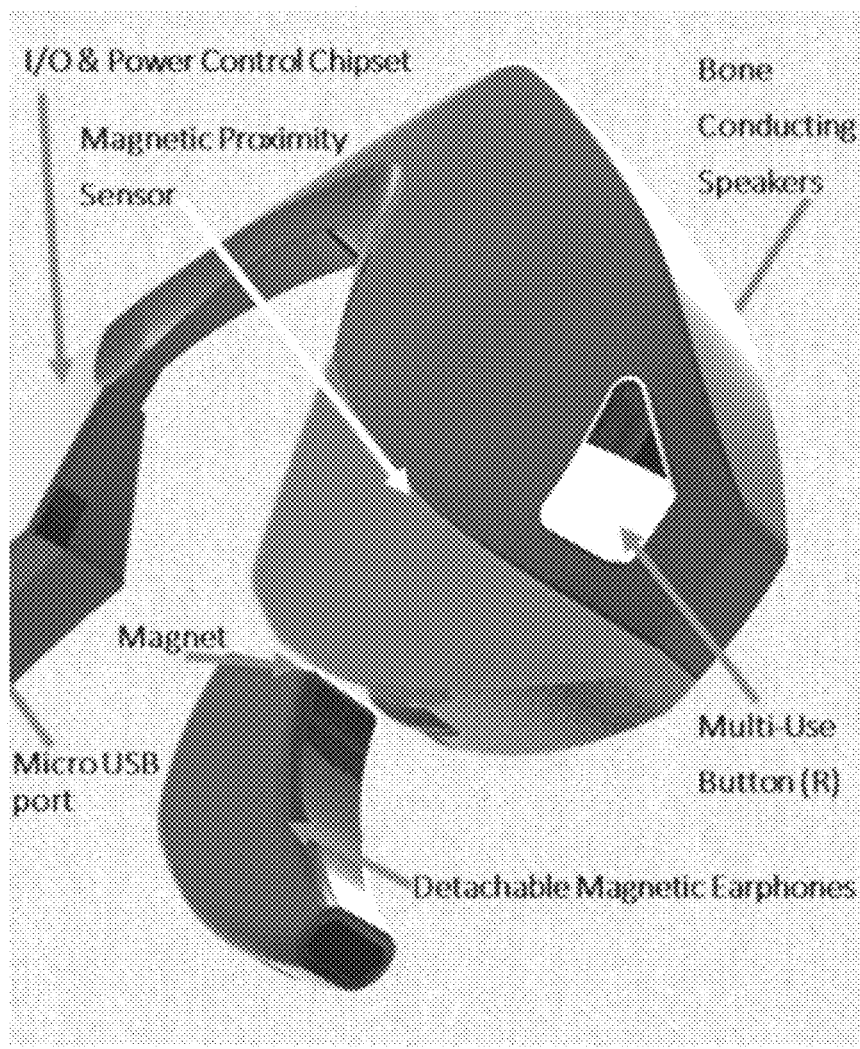

FIG. 7A is an illustration of another implementation of a multi-mode headset. FIGS. 7B and 7C are illustrations of portions of the implementation of a multi-mode headset of FIG. 7A. As shown in FIG. 7C, in some implementations, the aural transducer may be detachable and removable from a portion of the frame, rather than bending to an in-ear position as discussed above in connection with FIGS. 1A and 1B.

Figure 7D:
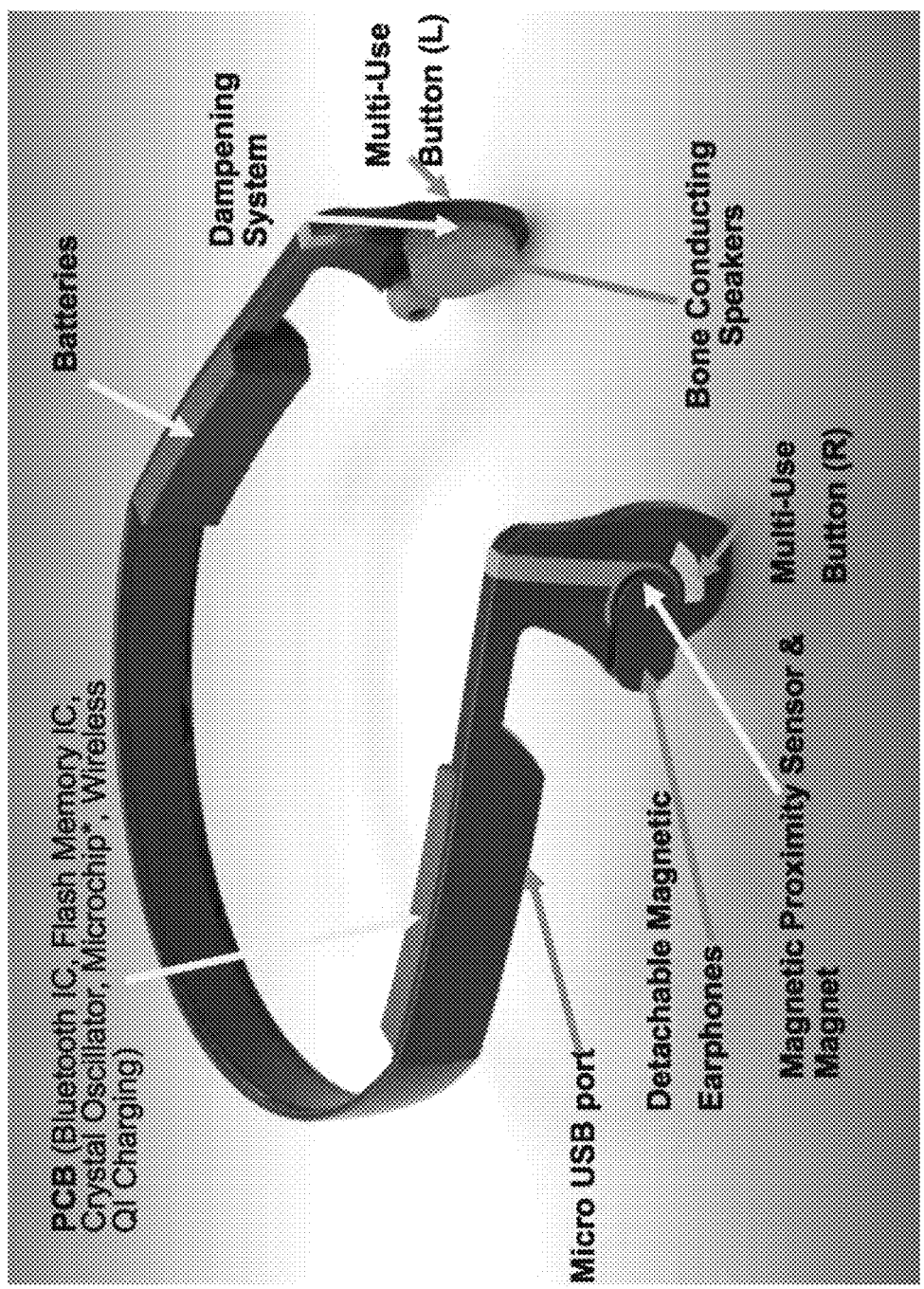
FIG. 7D is an illustration of still another implementation of a multi-mode headset.
Figure 7E:
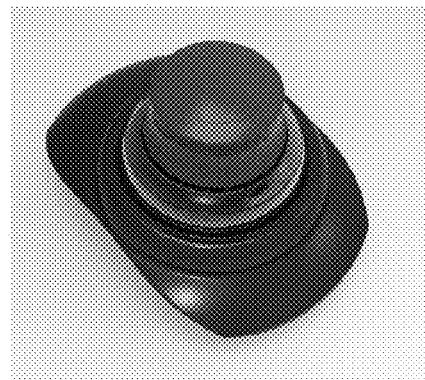
FIGS. 7E-7G are an isometric view, side view, and top view of an implementation of an earpiece for a multi-mode headset.
Figure 7F:
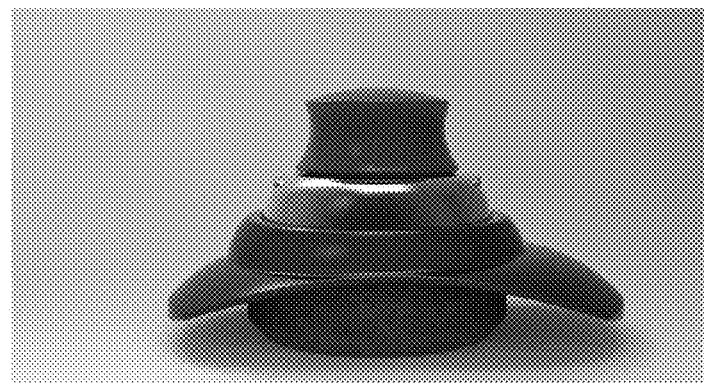
Figure 7G:
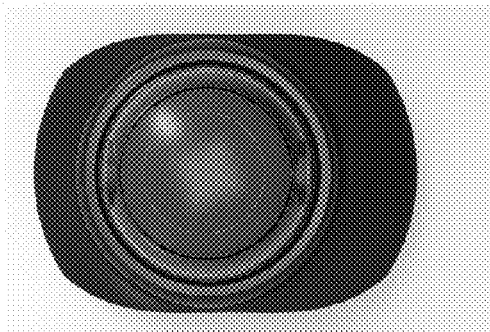
Figure 7H:
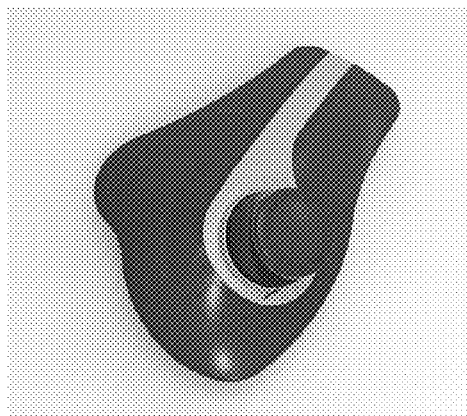
FIGS. 7H-7J are an isometric view, side view, and top view of an implementation of an audio-producing portion of a multi-mode headset.
Figure 7I:
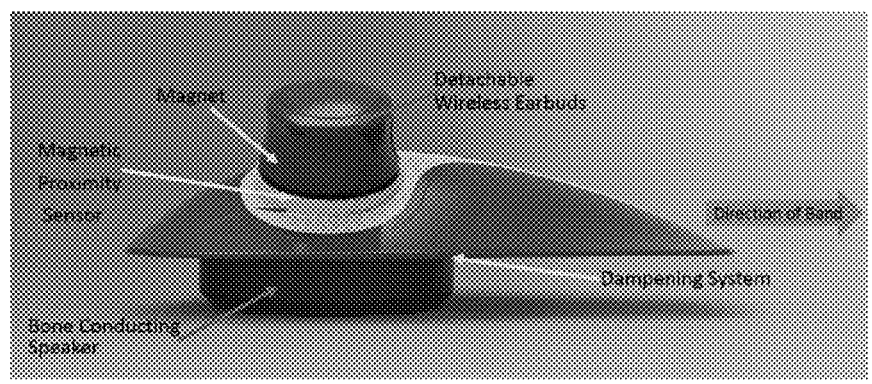
Figure 7J:
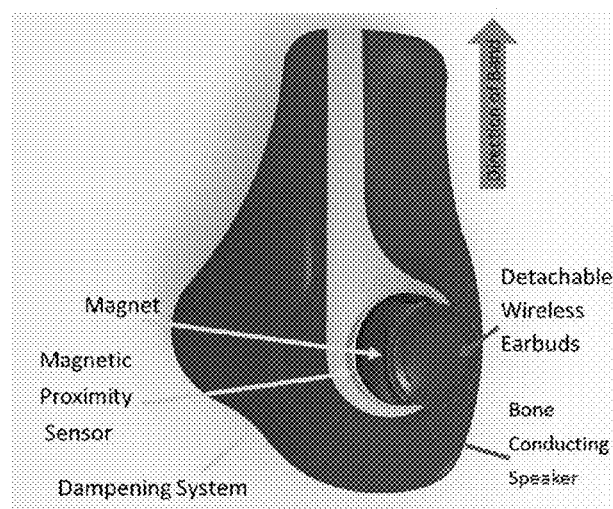
Figure 7K:
FIGS. 7K-7M are an isometric view, side view, and top view of an implementation of an audio-producing portion of a multi-mode headset.
Figure 7L:
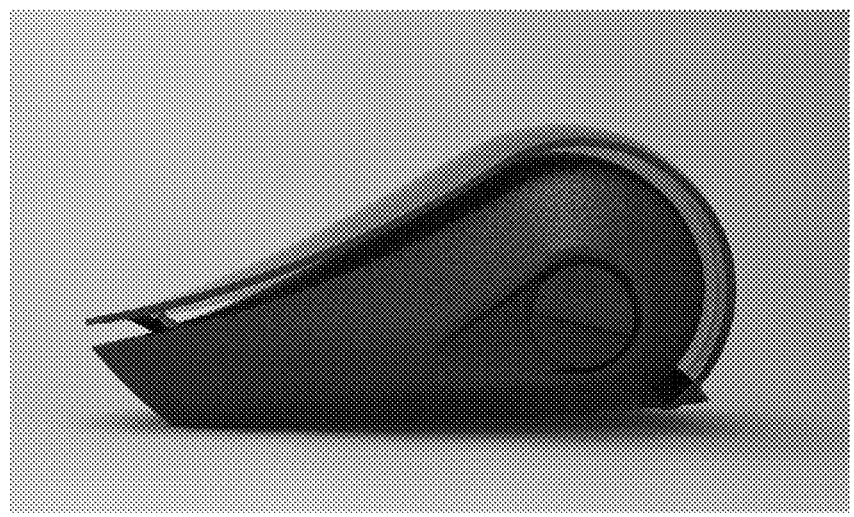
Figure 7M:
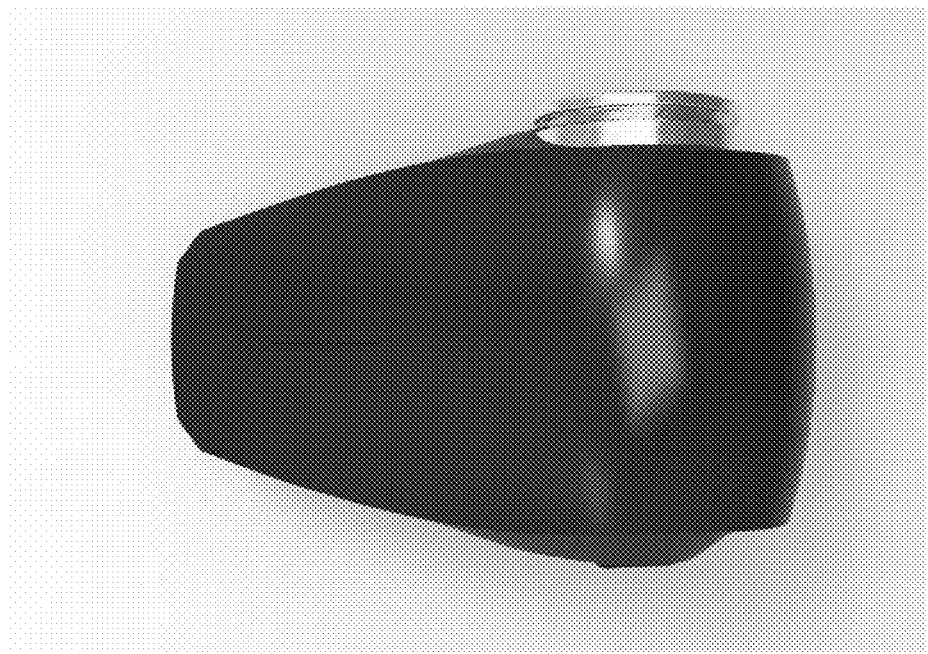

Similarly, FIG. 7D is an illustration of still another implementation of a multi-mode headset incorporate a removable aural transducer. FIGS. 7E-7G are an isometric view, side view, and top view of an implementation of an earpiece or removable aural transducer for a multi-mode headset. FIGS. 7H-7J are an isometric view, side view, and top view of an implementation of an audio-producing portion of a multi-mode headset with both a detachable wireless aural transducer and a bone conducting speaker. FIGS. 7K-7M are an isometric view, side view, and top view of an implementation of a bone conducting speaker on an audio-producing portion of a multi-mode headset.

Figure 8A:
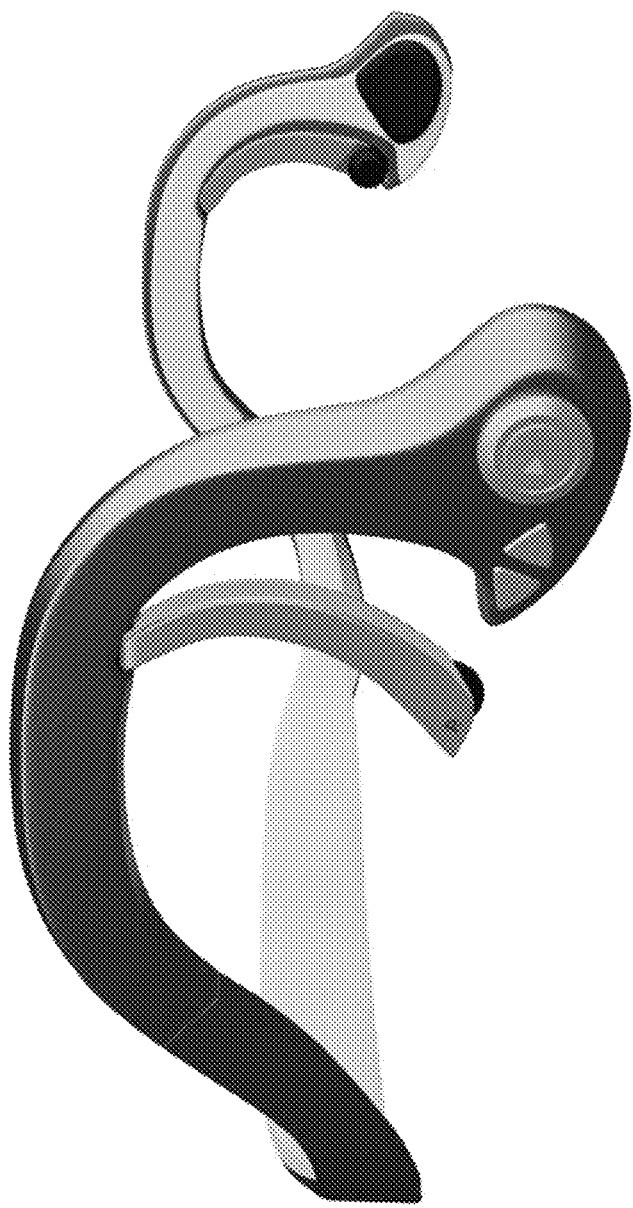
FIG. 8A is an illustration of another implementation of a multi-mode headset.
Figure 8B:
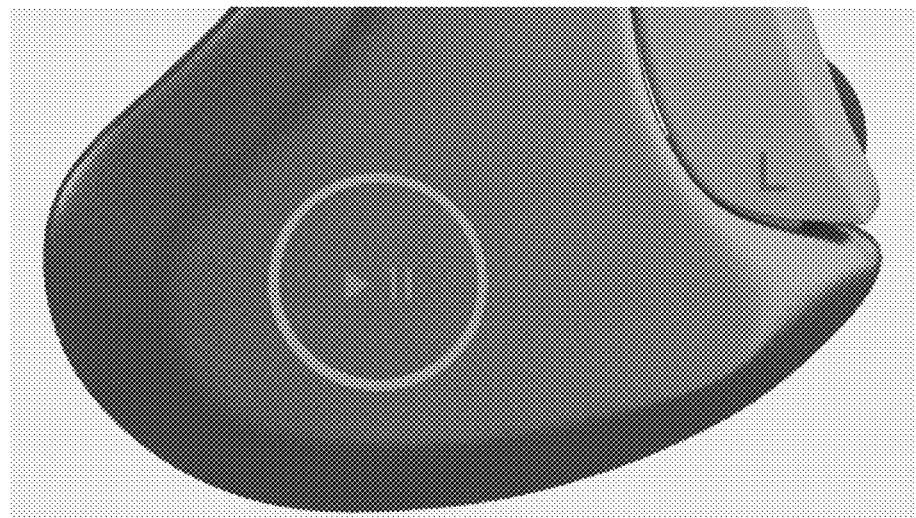
FIGS. 8B and 8C are illustrations of left and right portions, respectively, of the implementation of a multi-mode headset of FIG. 8A.
Figure 8C:
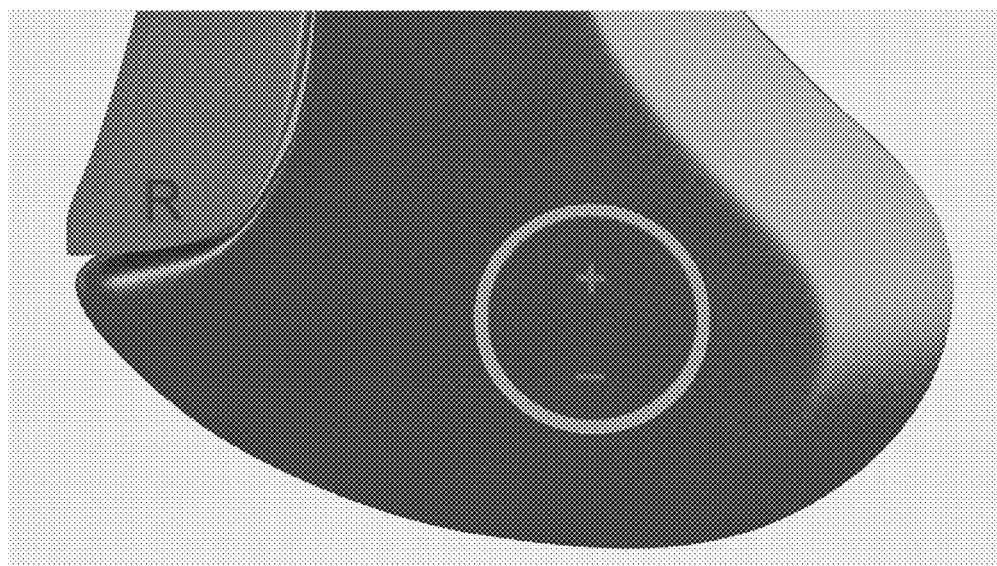
Figure 8D:
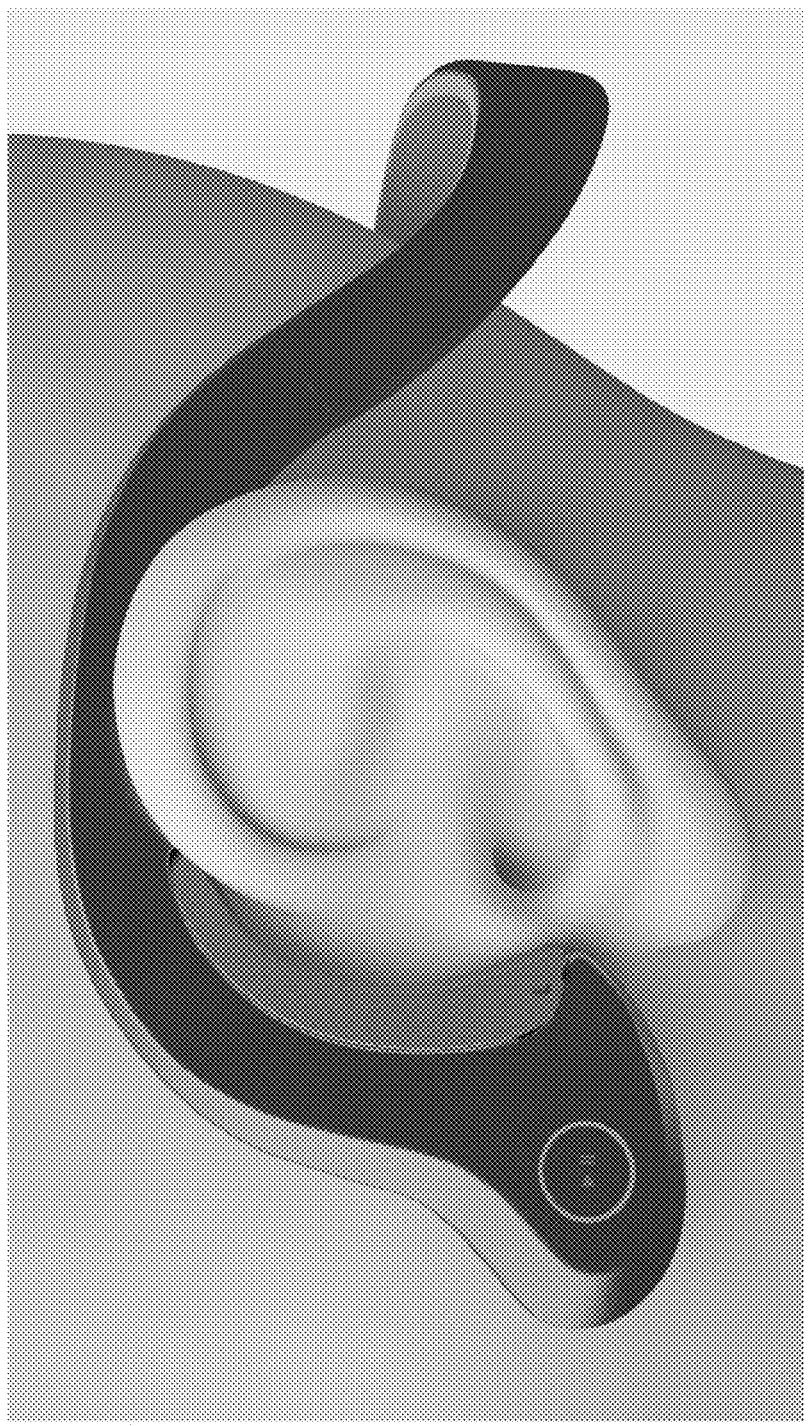
FIGS. 8D and 8E are illustrations of left and right sides, respectively, of the implementation of a multi-mode headset of FIG. 8A.
Figure 8E:

FIG. 8A is an illustration of another implementation of a multi-mode headset. As discussed above, some implementations of headsets may include exterior buttons for control of volume, playback, or other functions. Illustrated in FIGS. 8B and 8C are left and right portions, respectively, of the implementation of a multi-mode headset of FIG. 8A, showing examples of such control interfaces. FIGS. 8D and 8E are illustrations of left and right sides, respectively, of the implementation of a multi-mode headset of FIG. 8A, in position on a user's head.

Figure 8F:
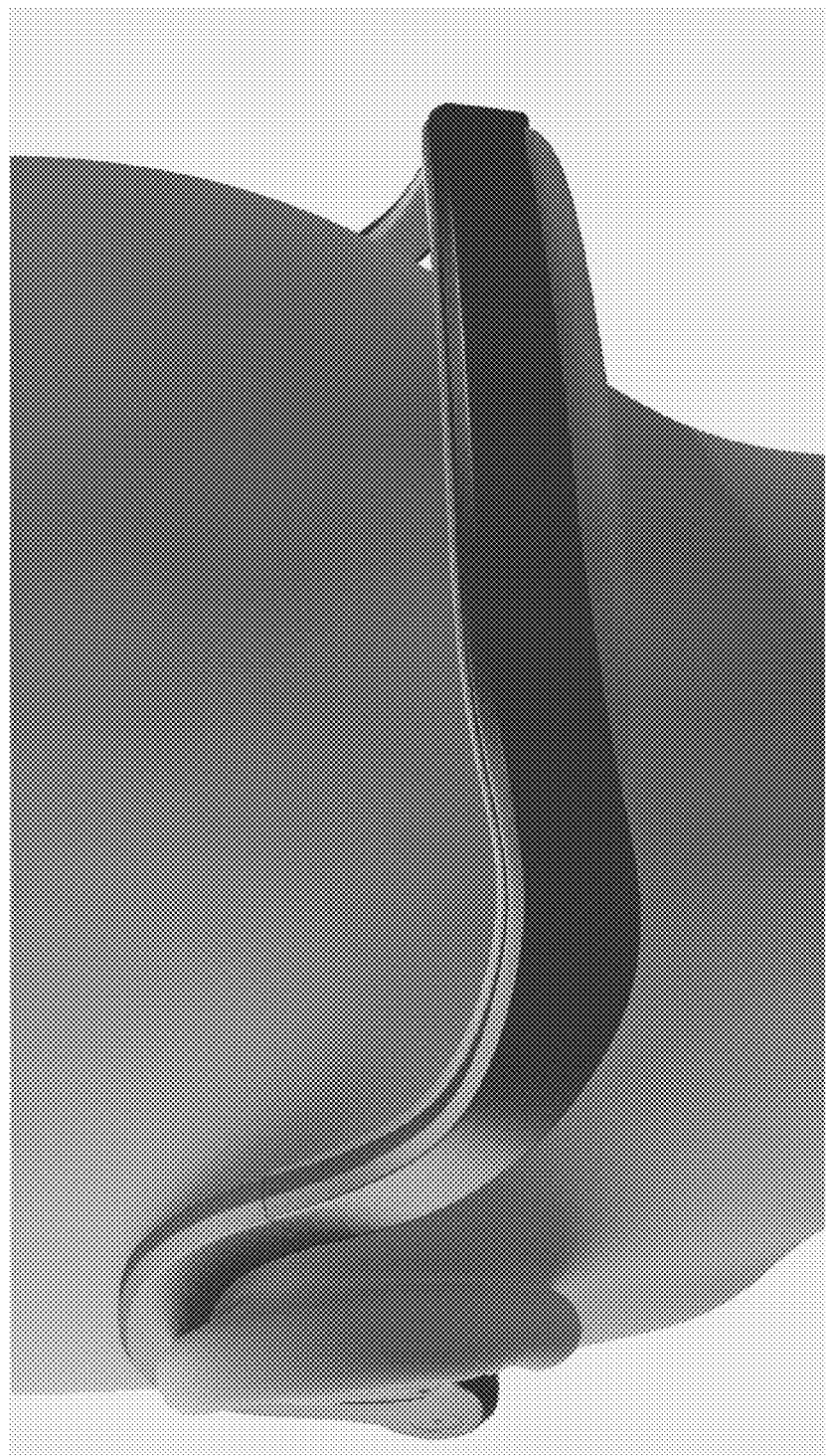
FIG. 8F is an illustration of a rear portion of the implementation of a multi-mode headset of FIG. 8A.

As discussed above, in some implementations, a headset may include a band for positioning behind or above the user's head. FIG. 8F is an illustration of a rear portion of the implementation of a multi-mode headset of FIG. 8A showing one possible implementation of such a behind-the-head band. The band may incorporate a rechargeable battery, antenna, or other such features.

Figure 8G:
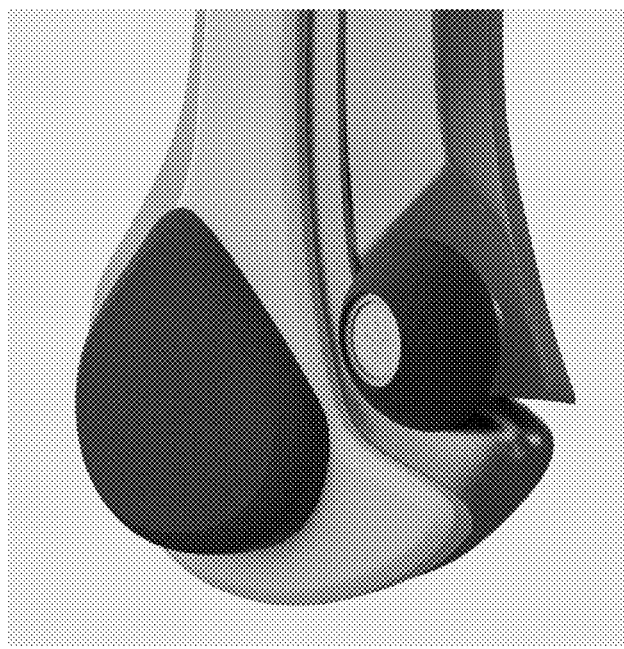
FIGS. 8G and 8H are illustrations of a portion of the implementation of a multi-mode headset of FIG. 8A in a bone-conduction and aural mode, respectively.
Figure 8H:
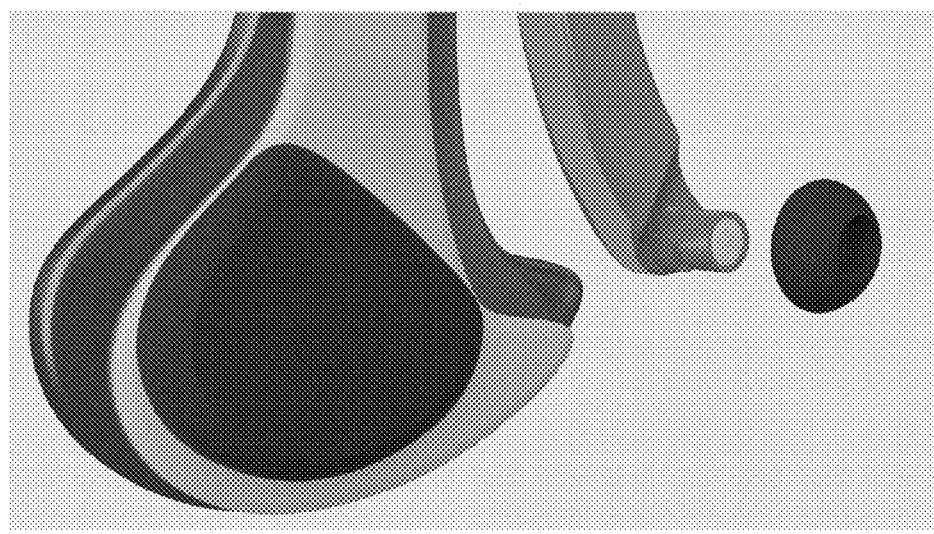

FIGS. 8G and 8H are illustrations of an interior portion of the implementation of a multi-mode headset of FIG. 8A in a bone-conduction and aural mode, respectively. In FIG. 8H, a rubber earpiece is shown removed from the aural transducer. In many implementations, the earpiece may be replaceable or may be removed for cleaning purposes.

Figure 9A:
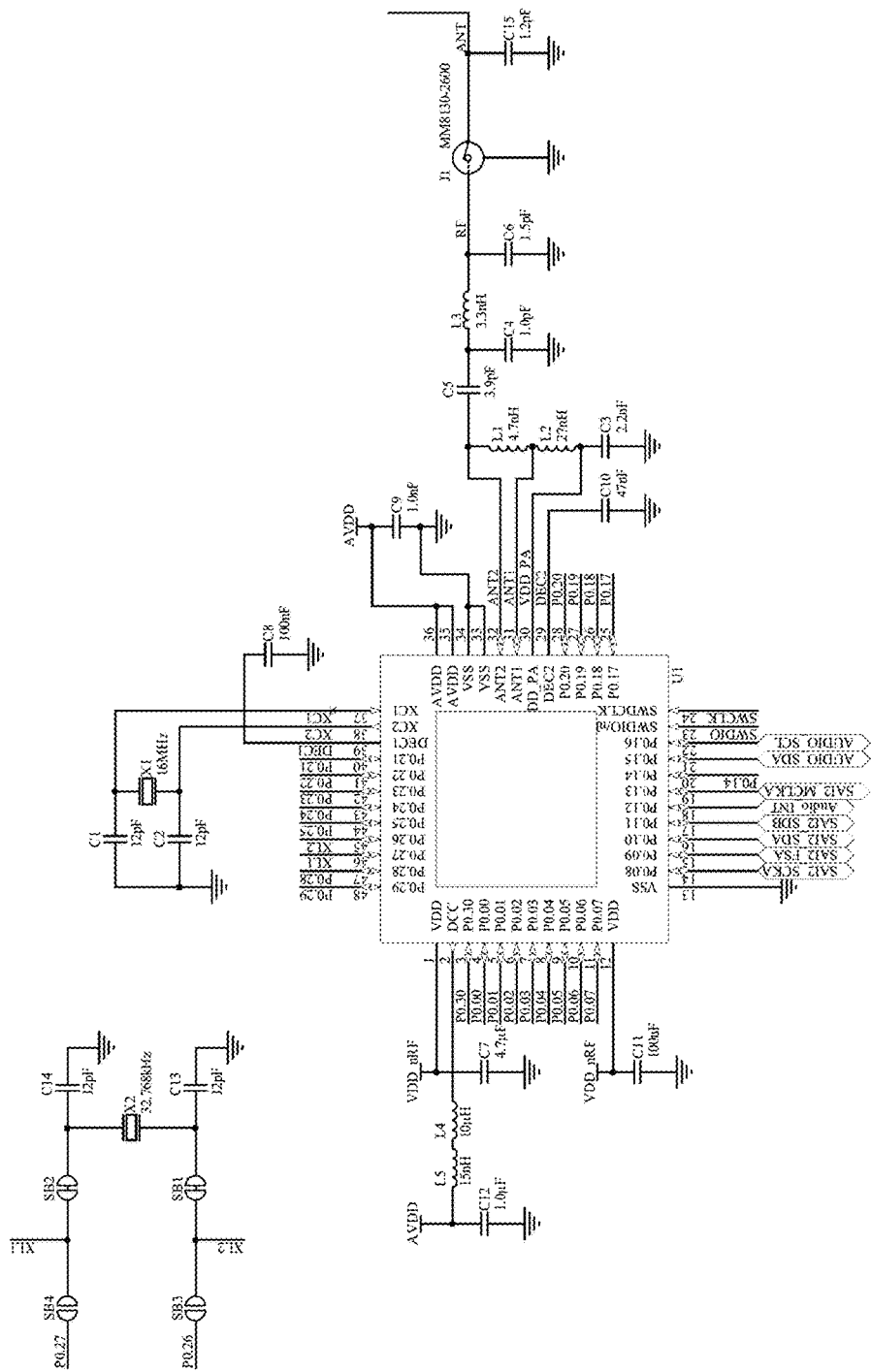
FIGS. 9A-9C are schematic diagrams of audio circuitry for implementations of a multi-mode headset.
Figure 9B:
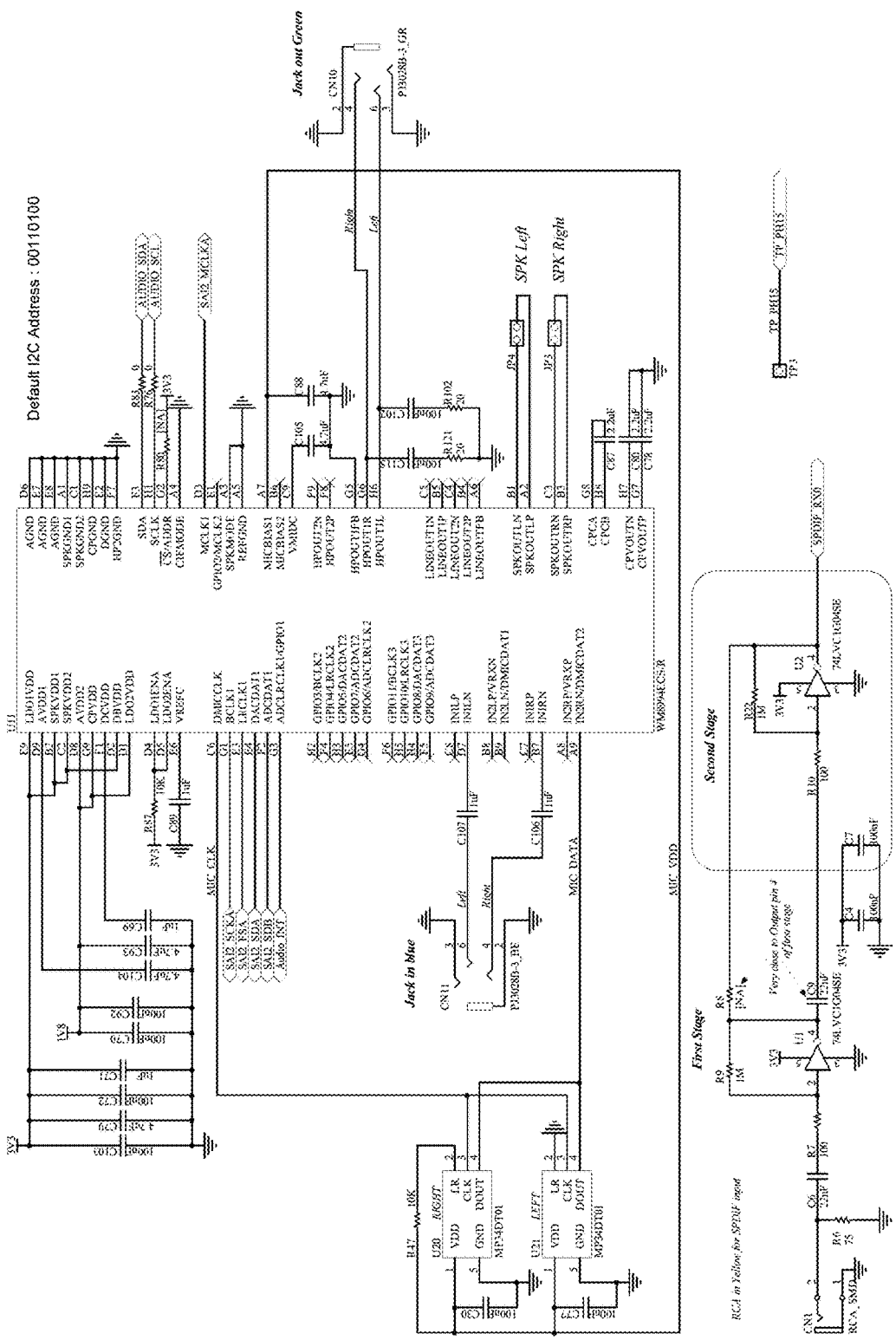
Figure 9C:
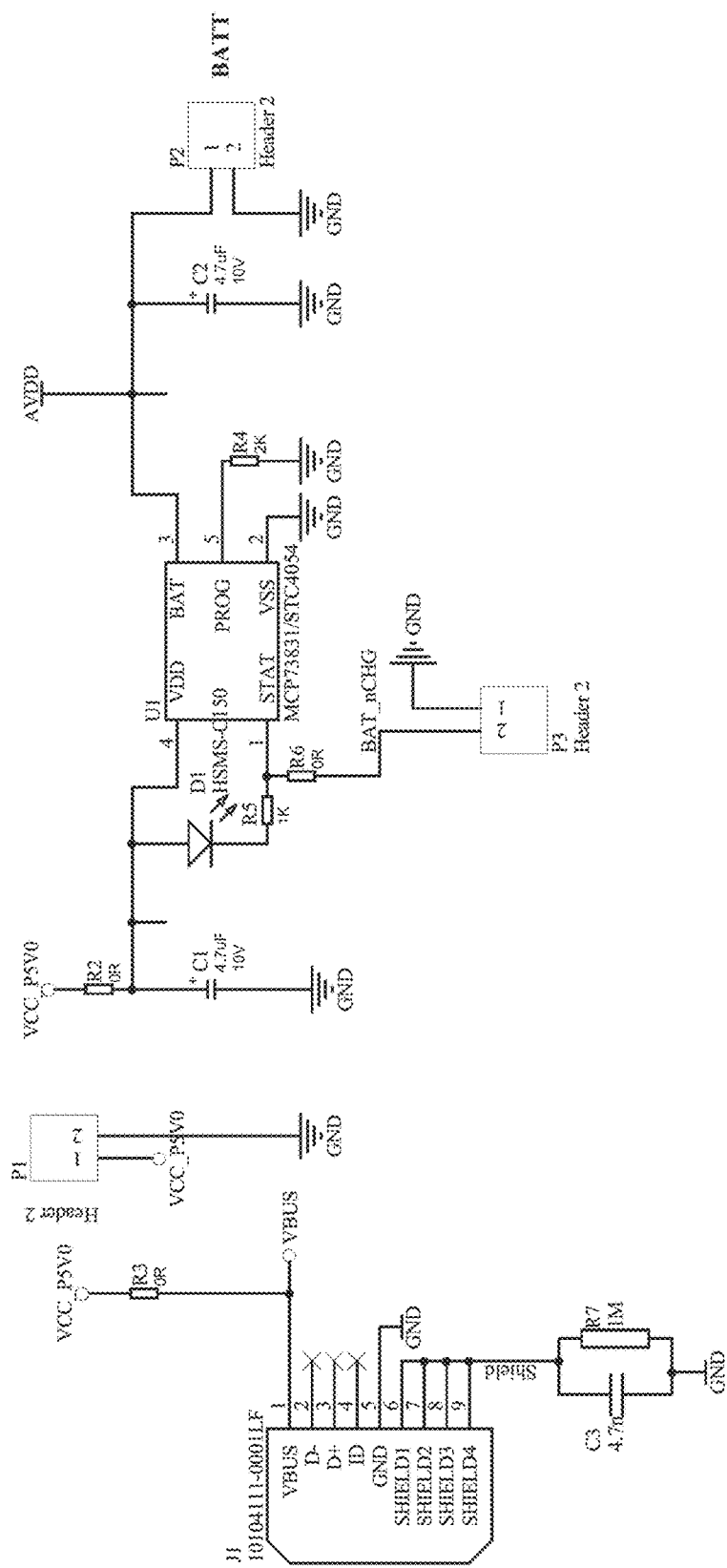

FIGS. 9A-9C are schematic diagrams of audio circuitry for implementations of a multi-mode headset. Specifically, FIG. 9A is a schematic illustrating connections to and from an integrated wireless audio processor in some implementations of a multi-mode headset, such as a Synic IA2S6 integrated wireless audio processor, a Broadcom BCM2037 wireless audio processor, or any other type and form of audio processor incorporating a wireless interface (such as Bluetooth). The processor may pair or otherwise communicate with a remote device, such as a tablet, smartphone, or other computing device, and may transmit and receive audio. As discussed above, in some implementations, audio may be retrieved and decoded from on-board storage, such as flash memory or other storage.

FIG. 9B is a schematic of connections to and from an audio codec in some implementations of a multi-mode headset, such as a WM8994 codec manufactured by Wolfson Microelectronics, or any other such type and form of audio A/D and D/A codec. In some implementations, the codec may have an integrated amplifier, while in other implementations, separate amplification components (not illustrated) may be included.

FIG. 9C is a schematic of a power supply and management interface for some implementations of a multi-mode headset. In some implementations, the headset may incorporate wireless charging components, while in other implementations, an input jack may be used (e.g. micro USB, coaxial DC, or any other type and form of interface).

Figure 10A:
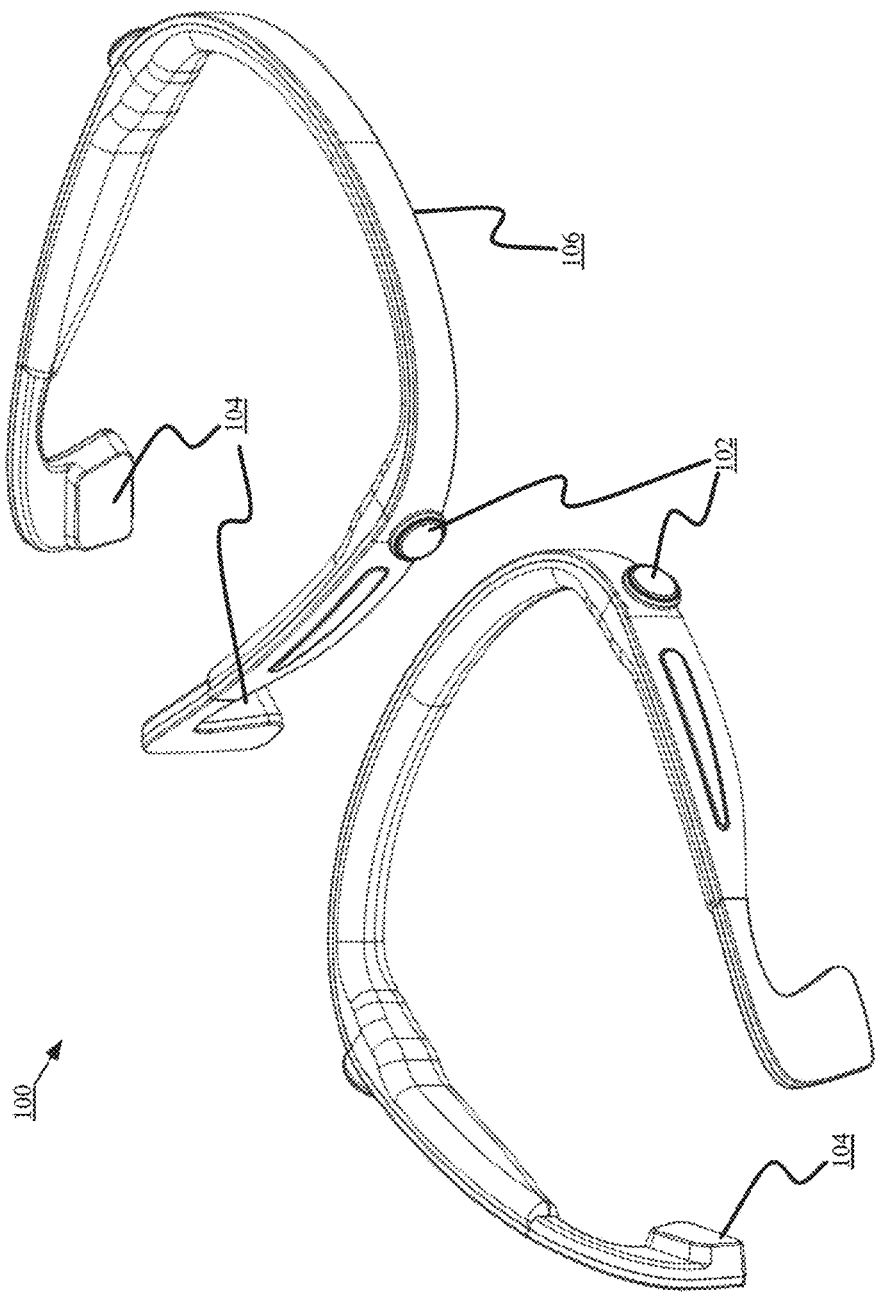
FIG. 10A are two isometric views of another implementation of a multi-mode headset.
Figure 10B:
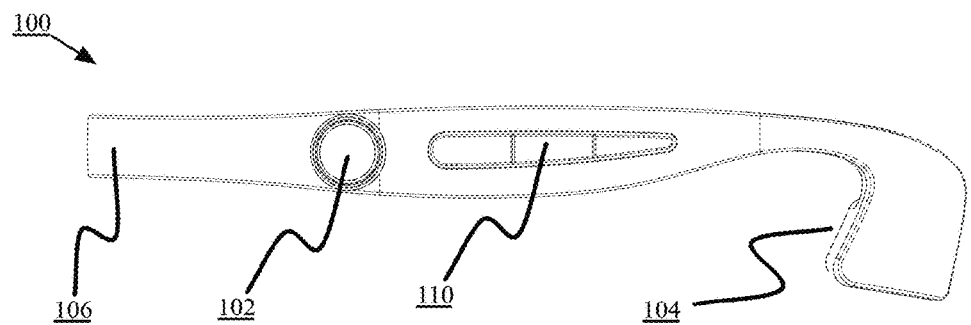
FIGS. 10B and 10C are left and right views, respectively, of the implementation of a multi-mode headset of FIG. 10A.
Figure 10C:
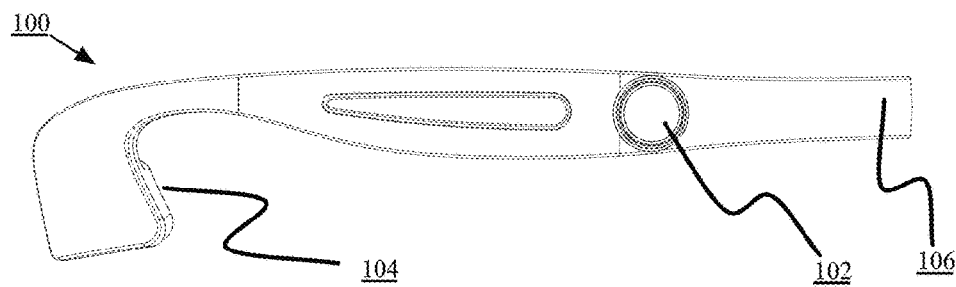
Figure 10D:
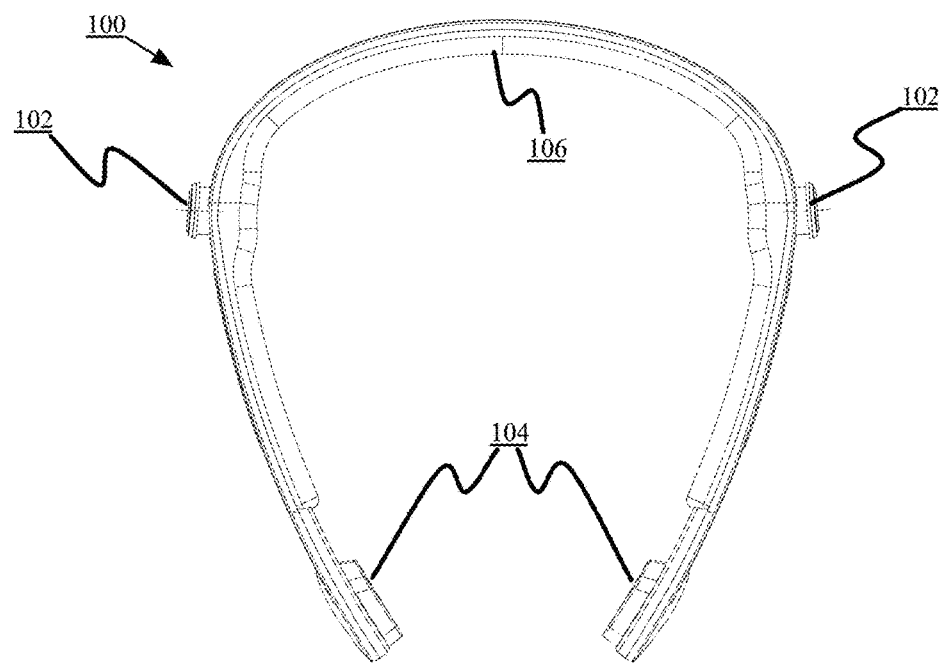
FIGS. 10D and 10E are top and bottom views, respectively of the implementation of a multi-mode headset of FIG. 10A.
Figure 10E:
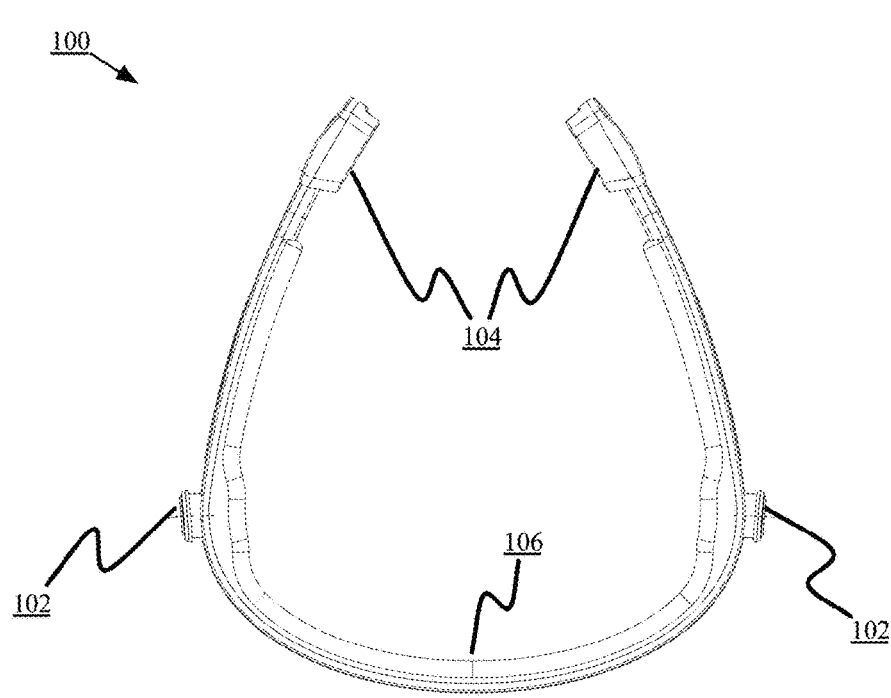

FIG. 10A are two isometric views of another implementation of a multi-mode headset 100. As discussed above, aural transducers 102, such as earbuds, may be stored in a nest, holder, or retention position when not in use. In many implementations, a switch or sensor within the nest or holder (e.g. a physical switch, magnetic switch, capacitive sensor, optical source and/or sensor, etc.) may detect the presence or absence of the aural transducers and disable or enable playback via the aural transducers accordingly, as discussed above. Bone conduction transducers 104 may be positioned during use over a user's temples or jawbone, as discussed above. FIGS. 10B and 10C are left and right views, respectively, of the implementation of a multi-mode headset of FIG. 10A. As shown in FIG. 10B, in some implementations, one or more controls 110 may be included on a portion of the headset, such as the band 106. Controls 110 may allow control over volume, pausing or playback of audio, skipping functions, answering or initiating telephone calls, or other such functions. FIGS. 10D and 10E are top and bottom views, respectively of the implementation of a multi-mode headset of FIG. 10A.

Figure 10F:
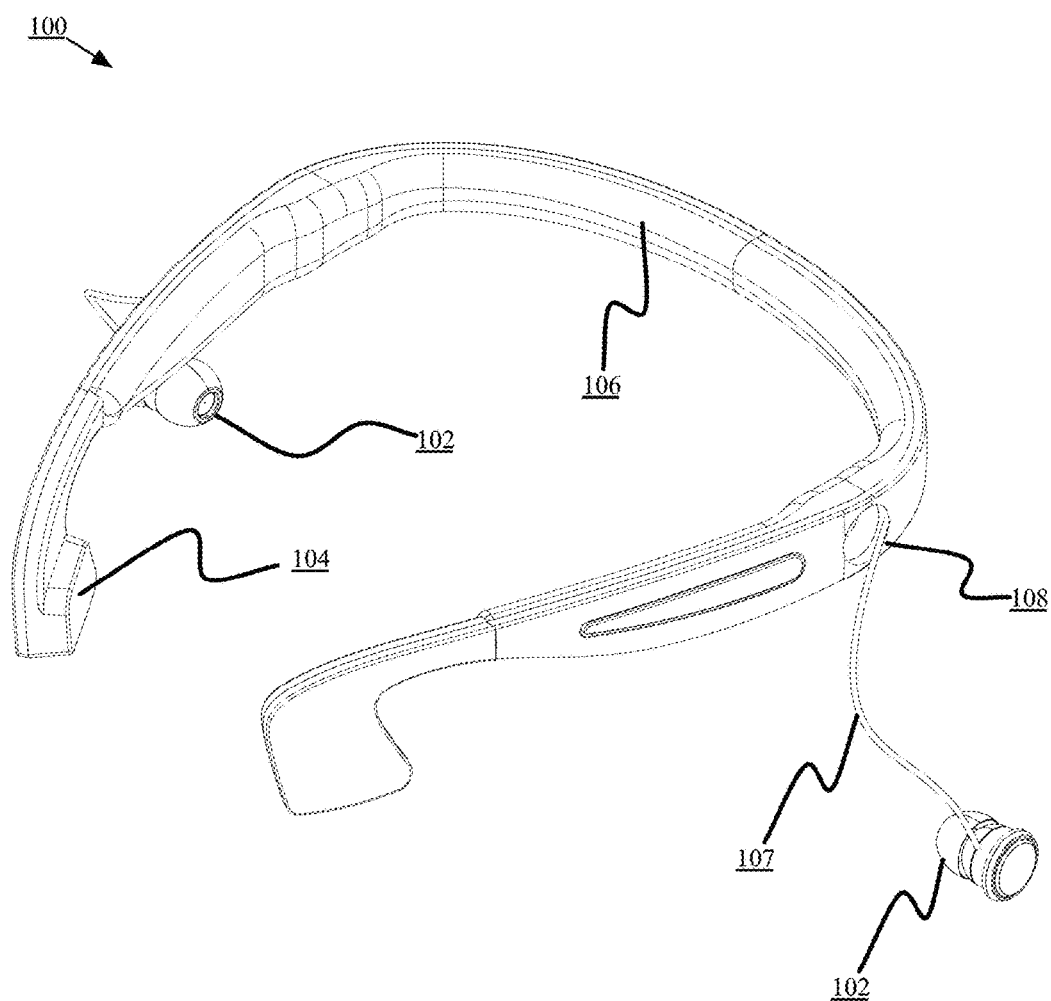
FIG. 10F is an isometric view of the implementation of a multi-mode headset of FIG. 10A with aural transducers extended.
Figure 10G:
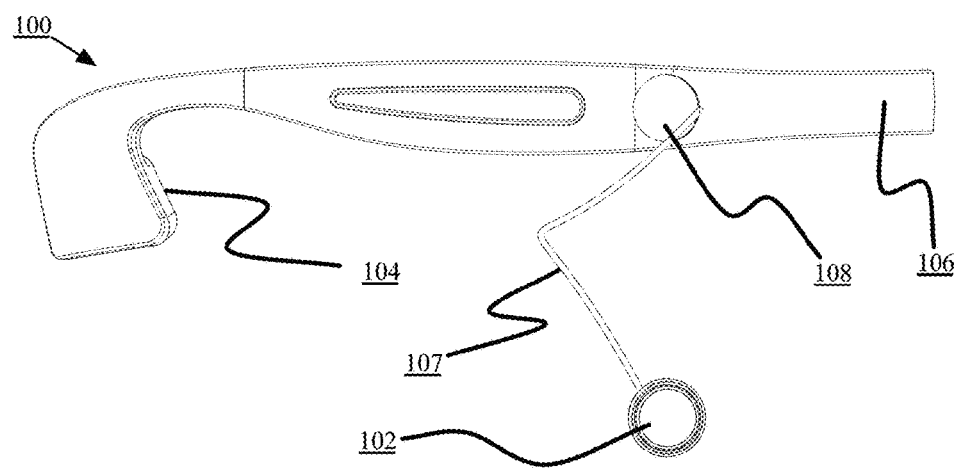
FIG. 10G is a side view of the implementation of a multi-mode headset of FIG. 10A with aural transducers extended.
Figure 10H:
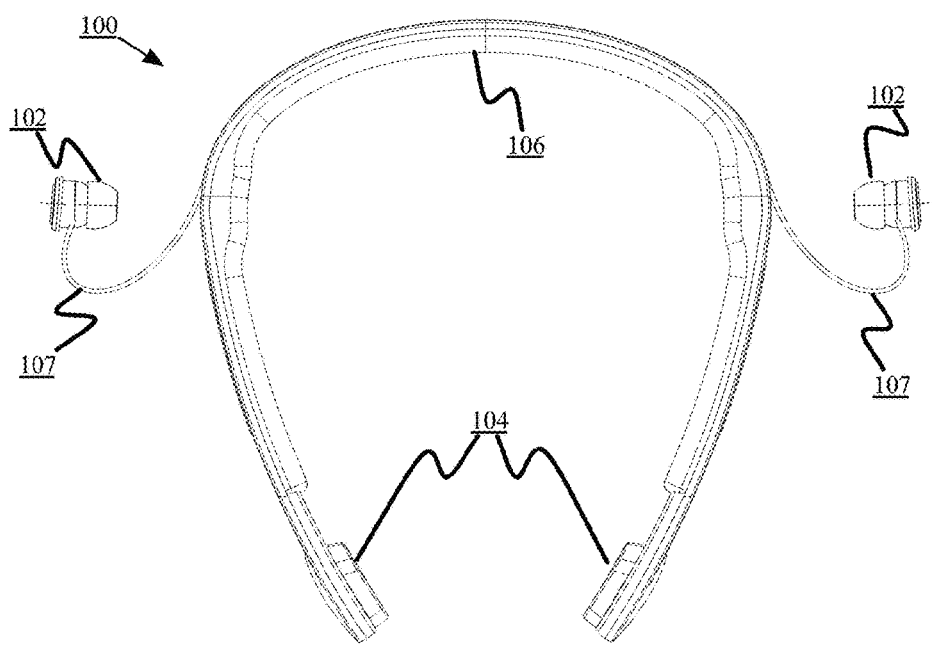
FIG. 10H is a top view of the implementation of a multi-mode headset of FIG. 10A with aural transducers extended.

FIG. 10F is an isometric view of the implementation of a multi-mode headset of FIG. 10A with aural transducers 102 extended, showing cable 107 and nest or retention holder 108. FIG. 10G is a side view of the implementation of a multi-mode headset of FIG. 10A with aural transducers extended, and FIG. 10H is a top view of the implementation of a multi-mode headset of FIG. 10A with aural transducers extended.

Figure 11A:
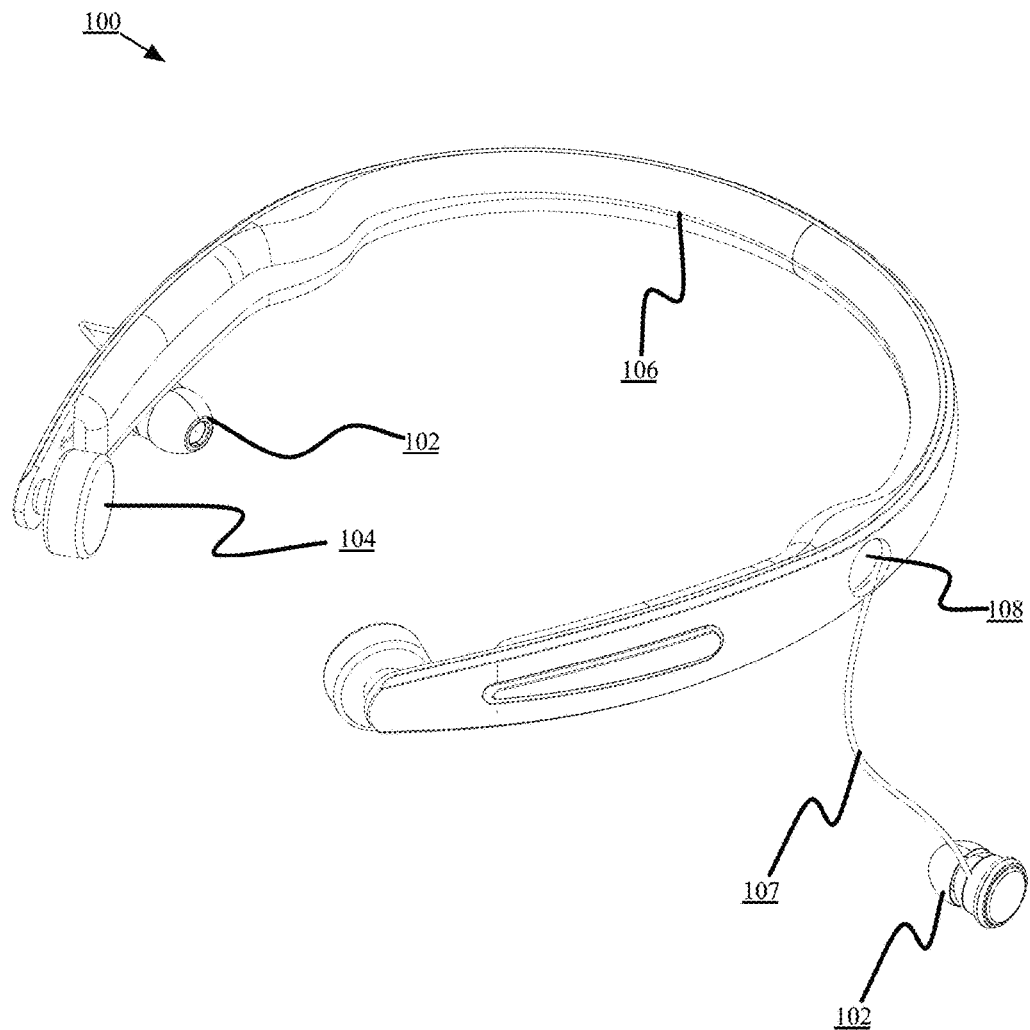
FIG. 11A is an isometric view of another implementation of a multi-mode headset, with aural transducers extended.
Figure 11B:
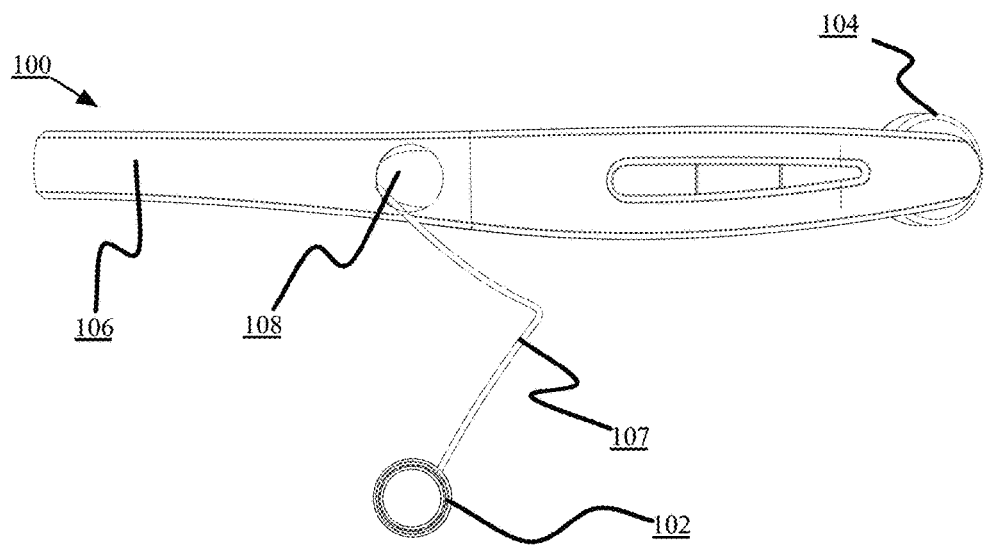
FIG. 11B is a side view of the implementation of a multi-mode headset of FIG. 11A with aural transducers extended.
Figure 11C:
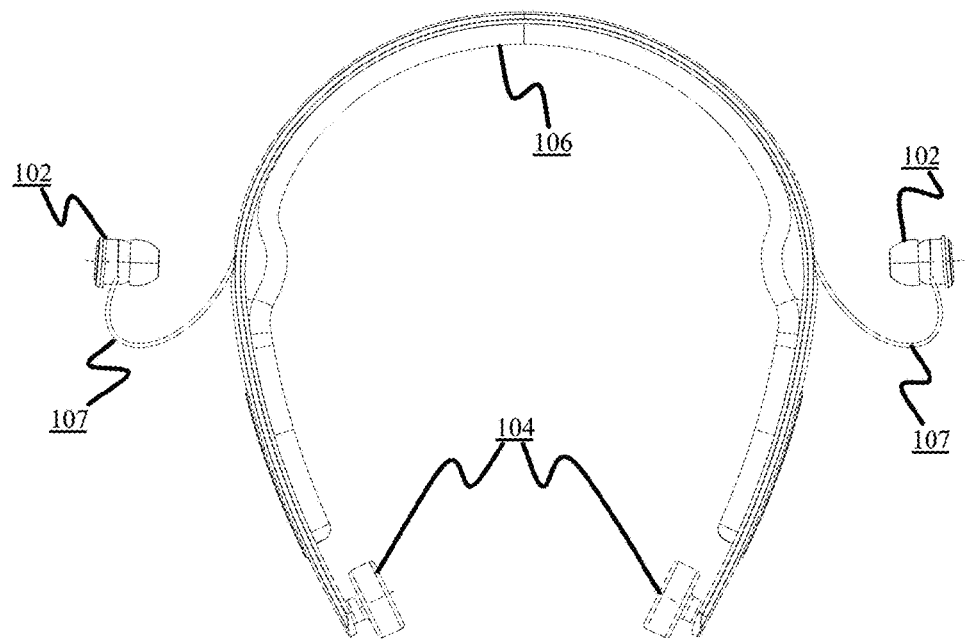
FIG. 11C is a top view of the implementation of a multi-mode headset of FIG. 11A with aural transducers extended.

The implementation of the multi-mode headset illustrated in FIGS. 10A-10H has bone conduction transducers 104 on a lowered portion of the frame or band. FIG. 11A is an isometric view of another implementation of a multi-mode headset with bone conduction transducers 104 in-line with the frame. Aural transducers 102 are extended in the view shown. FIG. 11B is a side view of the implementation of a multi-mode headset of FIG. 11A with aural transducers extended; and FIG. 11C is a top view of the implementation of a multi-mode headset of FIG. 11A with aural transducers extended.

Accordingly, the above disclosure is directed, in a first aspect, to a multi-mode audio headset. The headset includes a stereo pair of bone conduction transducers; a stereo pair of aural transducers; and circuitry for selectively routing a stereo audio signal to the stereo pair of bone conduction transducers or the stereo pair of aural transducers.

In some implementations, the circuitry comprises a switch configured to route the stereo audio signal to either the stereo pair of bone conduction transducers or the stereo pair of aural transducers. In other implementations, the circuitry comprises an inverse multiplexer configured to: in a first mode, route the stereo audio signal to the stereo pair of bone conduction transducers; in a second mode, route the stereo audio signal to the stereo pair of aural transducers; and in a third mode, route the stereo audio signal to the stereo pair of bone conduction transducers and the stereo pair of aural transducers. In still other implementations, the circuitry comprises a mixer configured to: in a first mode, route the stereo audio signal to the stereo pair of bone conduction transducers; in a second mode, route the stereo audio signal to the stereo pair of aural transducers; and in a third mode, route the stereo audio signal to the stereo pair of bone conduction transducers and the stereo pair of aural transducers. In a further implementation, the headset includes an equalizer configured to perform a first equalization of the stereo audio signal in the first mode, and a second, different equalization of the stereo audio signal in the third mode.

In some implementations, the headset includes a pair of audio cables, each connected to a corresponding aural transducer of the stereo pair of aural transducers; and a pair of cable retraction mechanisms, each configured to retract a corresponding audio cable of the pair of audio cables. In a further implementation, the pair of cable retraction mechanisms each comprise a take up reel, ratchet, and spring.

In some implementations, the headset includes a wireless transmitter configured for transmitting the stereo audio signal; and the stereo pair of aural transducers each comprise a wireless receiver configured to receive a portion of the stereo audio signal from the wireless transmitter. In other implementations, the headset includes a frame connected to the stereo pair of bone conduction transducers. In a further implementation, the frame further comprises a pair of retention nests configured to hold a corresponding aural transducer of the stereo pair of aural transducers when not in use. In a still further implementation, at least one retention nest of the pair of retention nests further comprises a switch configured to detect presence of an aural transducer of the stereo pair of aural transducers within the retention nest. In a yet still further implementation, the switch comprises a magnetic switch. In another yet still further implementation, the switch comprises a physical switch. In yet another yet still further implementation, the circuitry for selectively routing the stereo audio signal is further configured to route the stereo audio signal to the stereo pair of aural transducers responsive to a lack of detection, by the switch, of presence of the aural transducer of the stereo pair of aural transducers within the retention nest.

In some implementations, the headset includes a wireless receiver and communications interface configured to establish a communication link with a computing device. In a further implementation, the headset includes a memory device configured for storing audio data. In another further implementation, the headset includes a microphone. In other implementations, the headset includes a battery and wireless power receiver connected to the battery.

In another aspect, the present disclosure is directed to a method of operating a multi-mode audio headset. The method includes operating a multi-mode headset comprising a stereo pair of bone conduction transducers and a stereo pair of aural transducers in a first mode of operation, each of the aural transducers of the stereo pair positioned within a retention nest of a corresponding pair of retention nests of a frame of the multi-mode headset, the stereo pair of aural transducers disabled in the first mode of operation. The method also includes extracting the aural transducers from the retention nests to switch to a second mode of operation; and operating the multi-mode headset in the second mode of operation, the stereo pair of aural transducers enabled in the second mode of operation.

In some implementations, the method includes replacing the aural transducers in the retention nests to switch to the first mode of operation; and operating the multi-mode headset in the first mode of operation after replacing the aural transducers in the retention nests, the stereo pair of aural transducers again disabled in the first mode of operation.

Having described certain embodiments of systems for multi-mode headsets incorporating bone conduction and aural transducers, it will now become apparent to one of skill in the art that other embodiments incorporating the concepts of the invention may be used.

What is claimed:
1. A multi-mode audio headset, comprising:
 a stereo pair of bone conduction transducers;
 a stereo pair of aural transducers;
 a frame, connected to the stereo pair of bone conduction transducers, comprising a pair of retention nests configured to hold a corresponding aural transducer of the stereo pair of aural transducers when not in use, wherein at least one retention nest of the pair of retention nests further comprises a switch configured to detect presence of an aural transducer of the stereo pair of aural transducers within the retention nest; and circuitry for selectively routing a stereo audio signal to the stereo pair of bone conduction transducers or the stereo pair of aural transducers.

2. The multi-mode audio headset of claim 1, wherein the circuitry comprises a switch configured to route the stereo audio signal to either the stereo pair of bone conduction transducers or the stereo pair of aural transducers.

3. The multi-mode audio headset of claim 1, wherein the circuitry comprises an inverse multiplexer configured to:
   in a first mode, route the stereo audio signal to the stereo pair of bone conduction transducers;
   in a second mode, route the stereo audio signal to the stereo pair of aural transducers; and
   in a third mode, route the stereo audio signal to the stereo pair of bone conduction transducers and the stereo pair of aural transducers.

4. The multi-mode audio headset of claim 1, wherein the circuitry comprises a mixer configured to:
   in a first mode, route the stereo audio signal to the stereo pair of bone conduction transducers;
   in a second mode, route the stereo audio signal to the stereo pair of aural transducers; and
   in a third mode, route the stereo audio signal to the stereo pair of bone conduction transducers and the stereo pair of aural transducers.

5. The multi-mode audio headset of claim 4, further comprising an equalizer configured to perform a first equalization of the stereo audio signal in the first mode, and a second, different equalization of the stereo audio signal in the third mode.

6. The multi-mode audio headset of claim 1, further comprising:
   a pair of audio cables, each connected to a corresponding aural transducer of the stereo pair of aural transducers; and
   a pair of cable retraction mechanisms, each configured to retract a corresponding audio cable of the pair of audio cables.

7. The multi-mode audio headset of claim 6, wherein the pair of cable retraction mechanisms each comprise a take up reel, ratchet, and spring.

8. The multi-mode audio headset of claim 1, further comprising a wireless transmitter configured for transmitting the stereo audio signal; and
wherein the stereo pair of aural transducers each comprise a wireless receiver configured to receive a portion of the stereo audio signal from the wireless transmitter.

9. The multi-mode audio headset of claim 1, wherein the switch comprises a magnetic switch.

10. The multi-mode audio headset of claim 1, wherein the switch comprises a physical switch.

11. The multi-mode audio headset of claim 1, wherein the circuitry for selectively routing the stereo audio signal is further configured to route the stereo audio signal to the stereo pair of aural transducers responsive to a lack of detection, by the switch, of presence of the aural transducer of the stereo pair of aural transducers within the retention nest.

12. The multi-mode audio headset of claim 1, further comprising a wireless receiver and communications interface configured to establish a communication link with a computing device.

13. The multi-mode audio headset of claim 12, further comprising a memory device configured for storing audio data.

14. The multi-mode audio headset of claim 12, further comprising a microphone.

15. The multi-mode audio headset of claim 12, further comprising a battery and wireless power receiver connected to the battery.

16. A method of operating a multi-mode audio headset, comprising:
   operating a multi-mode headset comprising a stereo pair of bone conduction transducers and a stereo pair of aural transducers in a first mode of operation, each of the aural transducers of the stereo pair positioned within a retention nest of a corresponding pair of retention nests of a frame of the multi-mode headset, the stereo pair of aural transducers disabled in the first mode of operation;
   extracting the aural transducers from the retention nests to switch to a second mode of operation; and
   operating the multi-mode headset in the second mode of operation, the stereo pair of aural transducers enabled in the second mode of operation.

17. The method of claim 16, further comprising:
   replacing the aural transducers in the retention nests to switch to the first mode of operation; and
   operating the multi-mode headset in the first mode of operation after replacing the aural transducers in the retention nests, the stereo pair of aural transducers again disabled in the first mode of operation.

* * * * *